United States Patent
Yoshida et al.

(10) Patent No.: US 8,433,897 B2
(45) Date of Patent: Apr. 30, 2013

(54) GROUP SIGNATURE SYSTEM, APPARATUS AND STORAGE MEDIUM

(75) Inventors: Takuya Yoshida, Inagi (JP); Koji Okada, Tokyo (JP)

(73) Assignees: Kabushiki Kaisha Toshiba, Tokyo (JP); Toshiba Solutions Corporation, Tokyo (JP)

(*) Notice: Subject to any disclaimer, the term of this patent is extended or adjusted under 35 U.S.C. 154(b) by 257 days.

(21) Appl. No.: 12/884,742

(22) Filed: Sep. 17, 2010

(65) Prior Publication Data

US 2011/0060903 A1   Mar. 10, 2011

Related U.S. Application Data

(63) Continuation of application No. PCT/JP2009/054502, filed on Mar. 10, 2009.

(30) Foreign Application Priority Data

Mar. 19, 2008   (JP) .................................. 2008-072488

(51) Int. Cl.
    *H04L 9/32* (2006.01)
(52) U.S. Cl.
    USPC .............................. 713/155; 713/180; 380/44
(58) Field of Classification Search .................... 713/176
    See application file for complete search history.

(56) References Cited

U.S. PATENT DOCUMENTS

| | | | |
|---|---|---|---|
| 6,240,188 B1* | 5/2001 | Dondeti et al. ............... | 380/284 |
| 6,243,467 B1* | 6/2001 | Reiter et al. ................. | 380/30 |
| 6,584,566 B1* | 6/2003 | Hardjono .................... | 713/163 |
| 7,117,368 B2* | 10/2006 | Sako ............................ | 713/180 |
| 7,590,236 B1* | 9/2009 | Boneh et al. ................. | 380/30 |
| 8,200,977 B2* | 6/2012 | Yoshida et al. .............. | 713/180 |
| 2007/0256125 A1* | 11/2007 | Chen et al. .................. | 726/18 |
| 2012/0084567 A1* | 4/2012 | Hwang et al. ................ | 713/176 |
| 2012/0124379 A1* | 5/2012 | Teranishi ..................... | 713/175 |
| 2012/0159166 A1* | 6/2012 | Lee et al. ..................... | 713/168 |

FOREIGN PATENT DOCUMENTS

| | | |
|---|---|---|
| JP | 2000-162967 | 6/2000 |
| JP | 2005-210638 | 8/2005 |

OTHER PUBLICATIONS

Jan Camenisch, et al., "Group Signatures: Better Efficiency and New Theoretical Aspects", Forth International Conference on Security in Communication Networks—SCN 2004, LNCS 3352, 2005, pp. 120-133.

Jun Furukawa et al., "An Efficient Group Signature Scheme from Bilinear Maps", ACISP 2005, LNCS 3574, 2005, pp. 455-467.

(Continued)

*Primary Examiner* — Farid Homayounmehr
*Assistant Examiner* — Henry Tsang
(74) *Attorney, Agent, or Firm* — Oblon, Spivak, McClelland, Maier & Neustadt, L.L.P.

(57) ABSTRACT

A group signature system according to one embodiment of the present invention comprises a group administrator apparatus, signer apparatuses and a verifier apparatus which can communicate with one another. Here, in a group signature method used by the apparatuses, a multiplication cyclic group or a bilinear group in which an order is unknown as in RSA is not used at all, but a multiplication cyclic group gG of a prime order q is only used, and representation parts $k_{i1}$ and $k_{i2}$ are used as a member private key. Moreover, as information for tracing a signer, $T_i = G_1^{\{k_{i1}\}}$ is utilized, and $k_{i1}$ is utilized for verifying revocation. In consequence, a calculation amount can be decreased to increase a calculation speed as compared with conventional [CG04], [FI05] and [DP06] systems.

9 Claims, 26 Drawing Sheets

OTHER PUBLICATIONS

Cecile Delerablee, et al., "Dynamic Fully Anonymous Short Group Signatures", VIETCRYPT, LNCS 4341, 2006, pp. 193-210.

Takuya Yoshida, et al., "Efficient Group Signature Scheme based on the DDH Problem", IEICE Technical Report, Jul. 13, 2007, vol. 107, No. 141, pp. 141-146.

Koji Okada, et al, "Group Signature Scheme for Low-Power Device", 2005 Symposium on Cryptography and Information Security SCIS 2005, The Institute of Electronics, Information and Communication Engineers, Jan. 25, 2005, 8 pages.

Koji Okada, et al., "Group Signature with Signing Key Revocation using Broadcast", 2004 Symposium on Cryptography and Information Security, The Institute of Electronics, Information and Communication Engineers, Jan. 27, 2004, 9 pages.

Takuya Yoshida et al., "Simple and Efficient Group Signature Scheme Assuming Tamperproof Devices", LNCS 2008, vol. 5312, pp. 83-99.

* cited by examiner

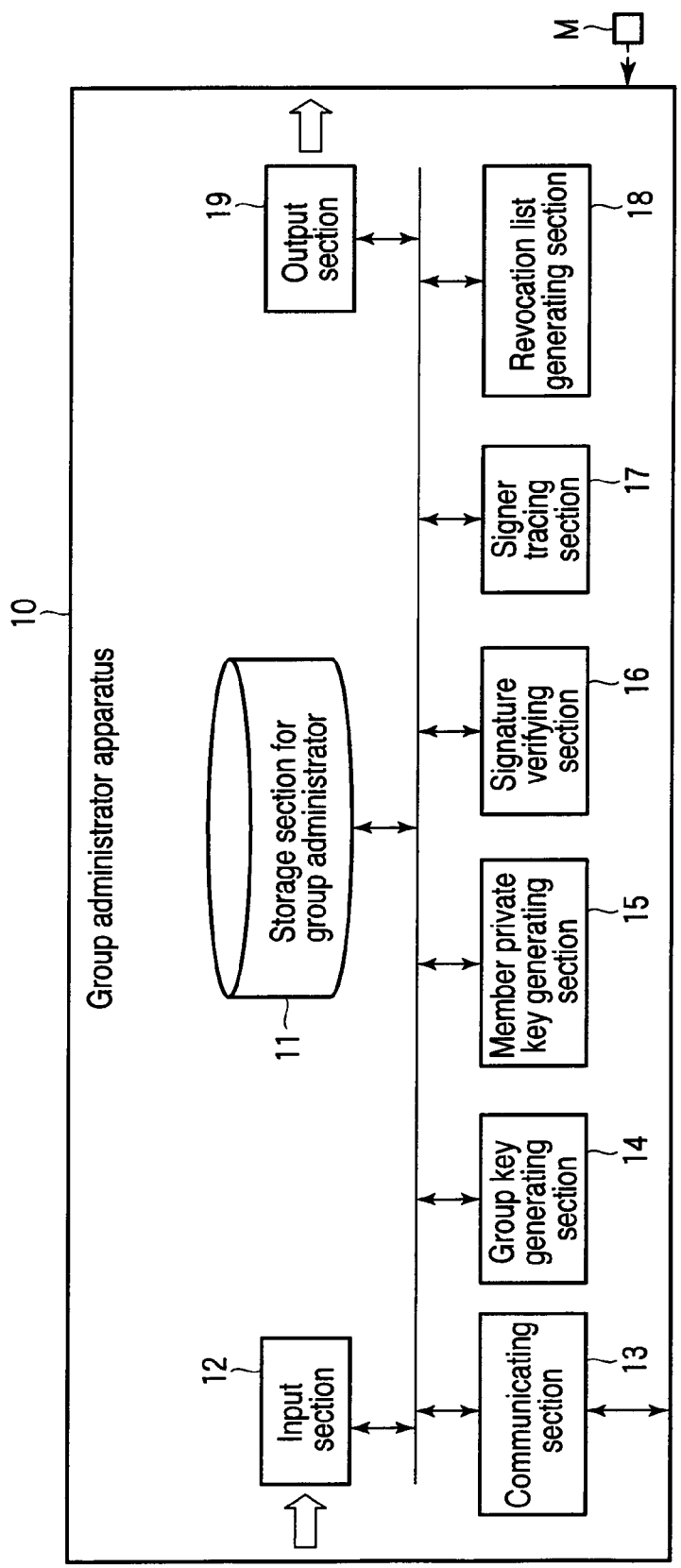
F I G. 2

Storage section for group administrator

| Public parameter | Group public key gpk | Member private key generating private key ik | Signer tracing private key ok |
|---|---|---|---|
| q, gG, G$_1$, Hash | G$_1$, G$_2$, F, C, D, H, Hash | a, b | x$_1$, x$_2$, y$_1$, y$_2$, z |

Member information

| | ID(1) | ... | ID(i) | ... | ID(j) | ... | ID(n) |
|---|---|---|---|---|---|---|---|
| User identifying information | ID(1) | ... | ID(i) | ... | ID(j) | ... | ID(n) |
| Member private key | gsk[1] | ... | gsk[i] | ... | gsk[j] | ... | gsk[n] |
| Revocation token | grt[1] | ... | grt[i] | ... | grt[j] | ... | grt[n] |
| Signer tracing information | T$_1$ | ... | T$_i$ | ... | T$_j$ | ... | T$_n$ |

User administrating information

| | ID(1) | ... | ID(i) | ... | ID(j) | ... | ID(n) |
|---|---|---|---|---|---|---|---|
| User identifying information | ID(1) | ... | ID(i) | ... | ID(j) | ... | ID(n) |
| User information | Name, contact address, settlement information, etc. | ... | ... | ... | ... | ... | ... |

| Message | Group signature σ |
|---|---|
| msg | U$_1$, U$_2$, E, V, R, β, s$_1$, s$_2$, s$_r$ |

Signer information

| User identifying information | ID(i) |
|---|---|
| Signer information correctness proof | τ |

Calculation table

| 1 | G$_1$ | G$_2$ | G$_1$G$_2$ |
|---|---|---|---|
| F | FG$_1$ | FG$_2$ | FG$_1$G$_2$ |
| 1 | H | G$_1$ | HG$_1$ |

FIG. 3

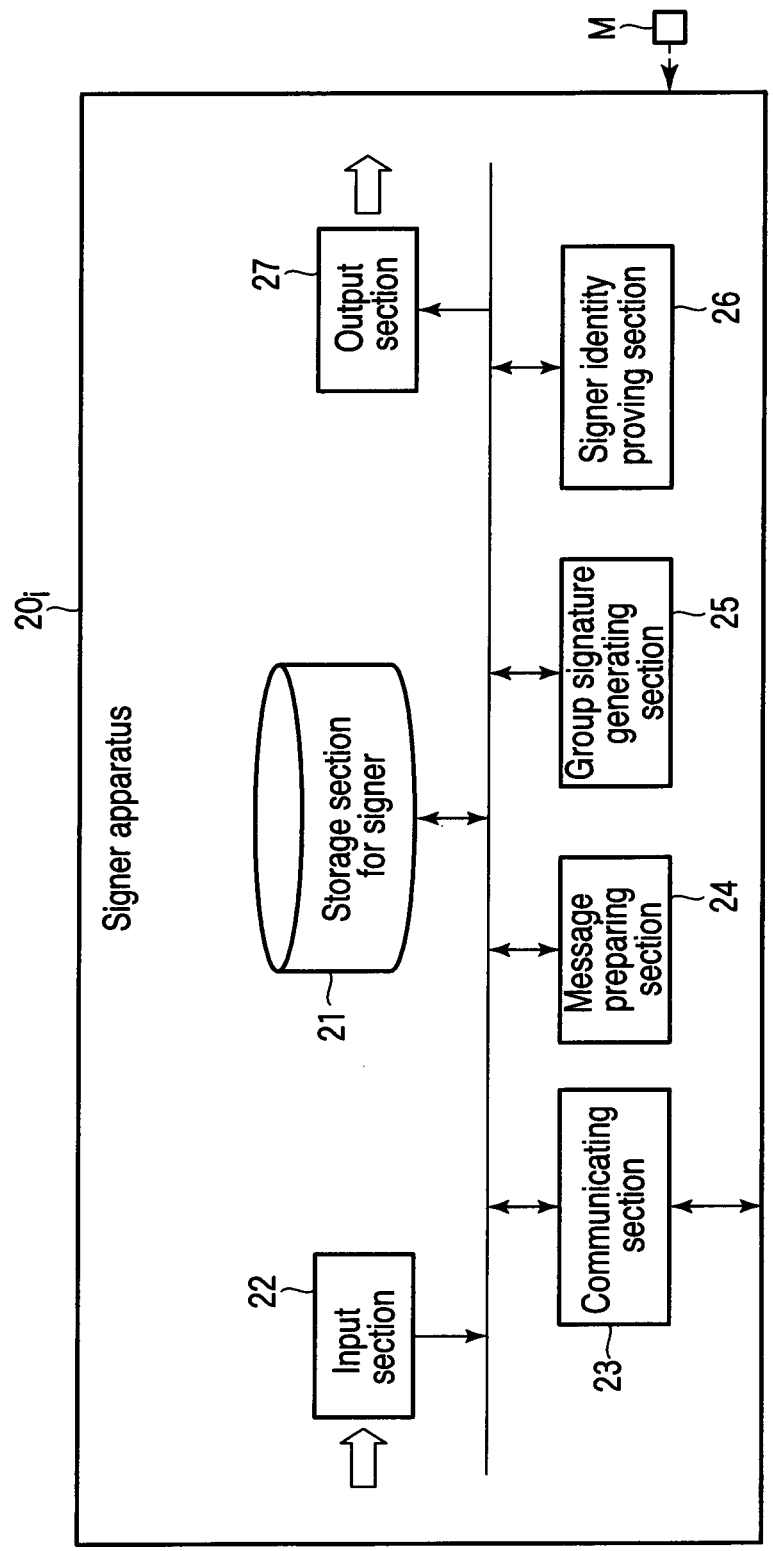
F I G. 4

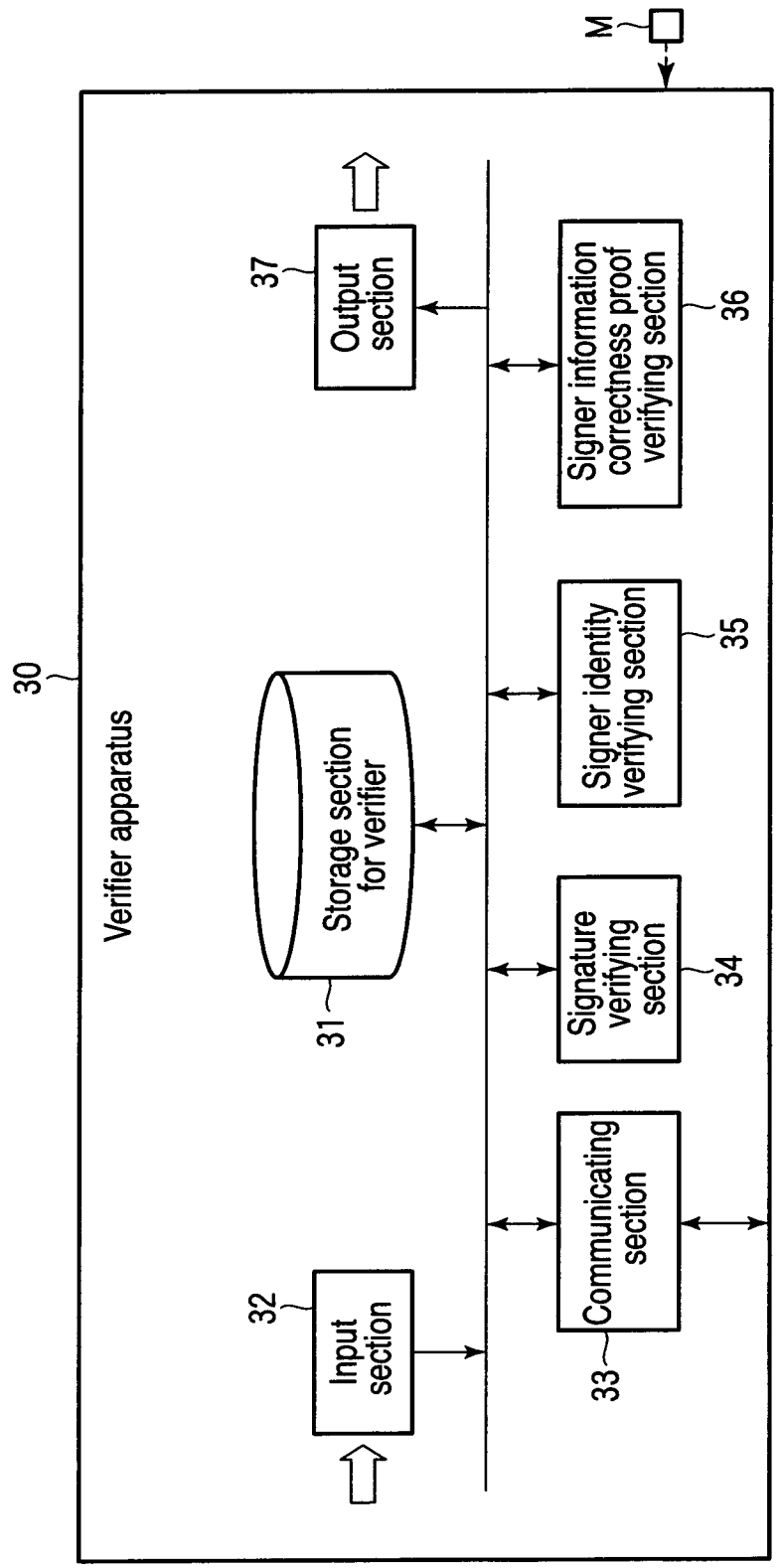
F I G. 6

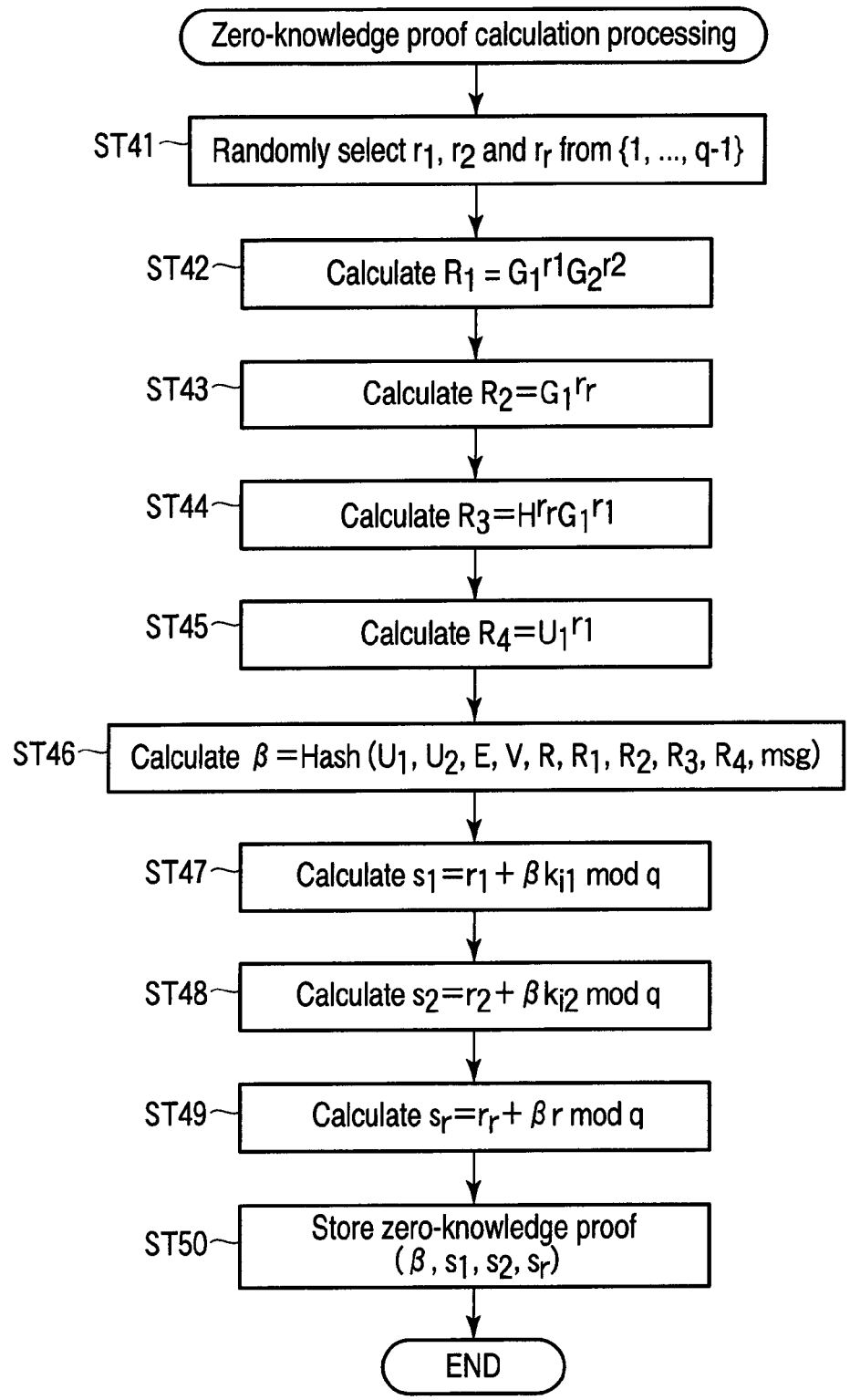
F I G. 12

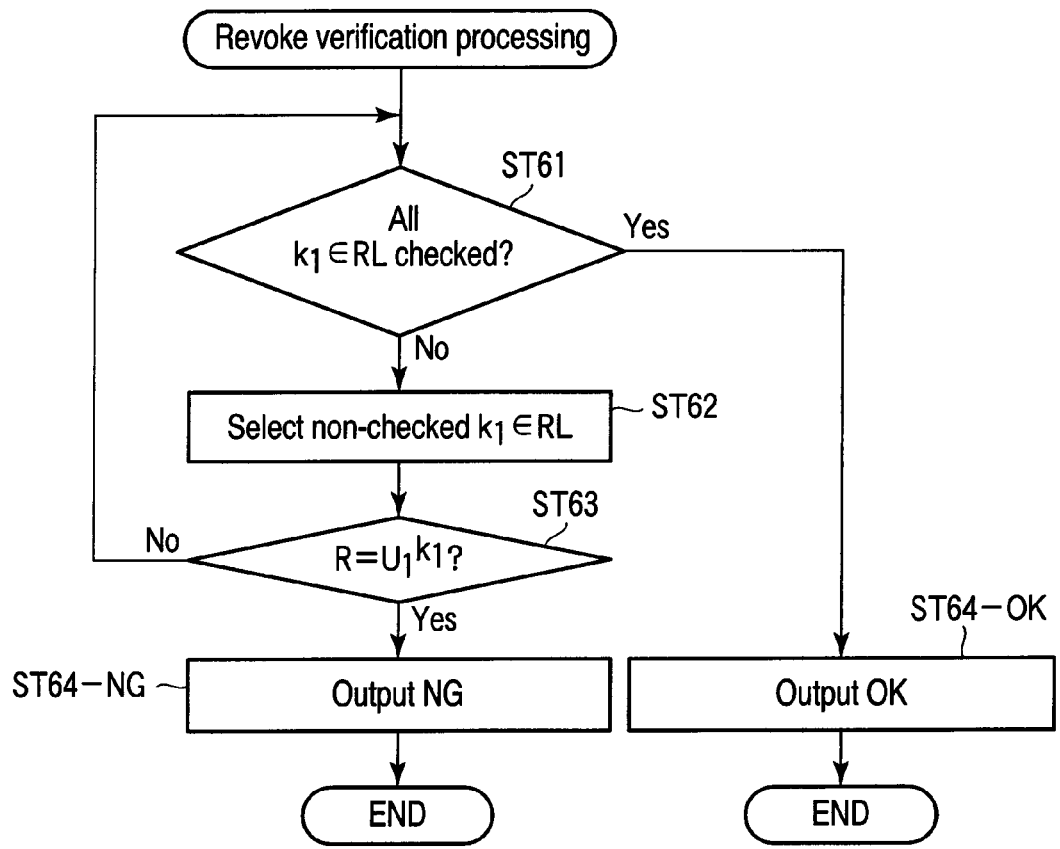
F I G. 14

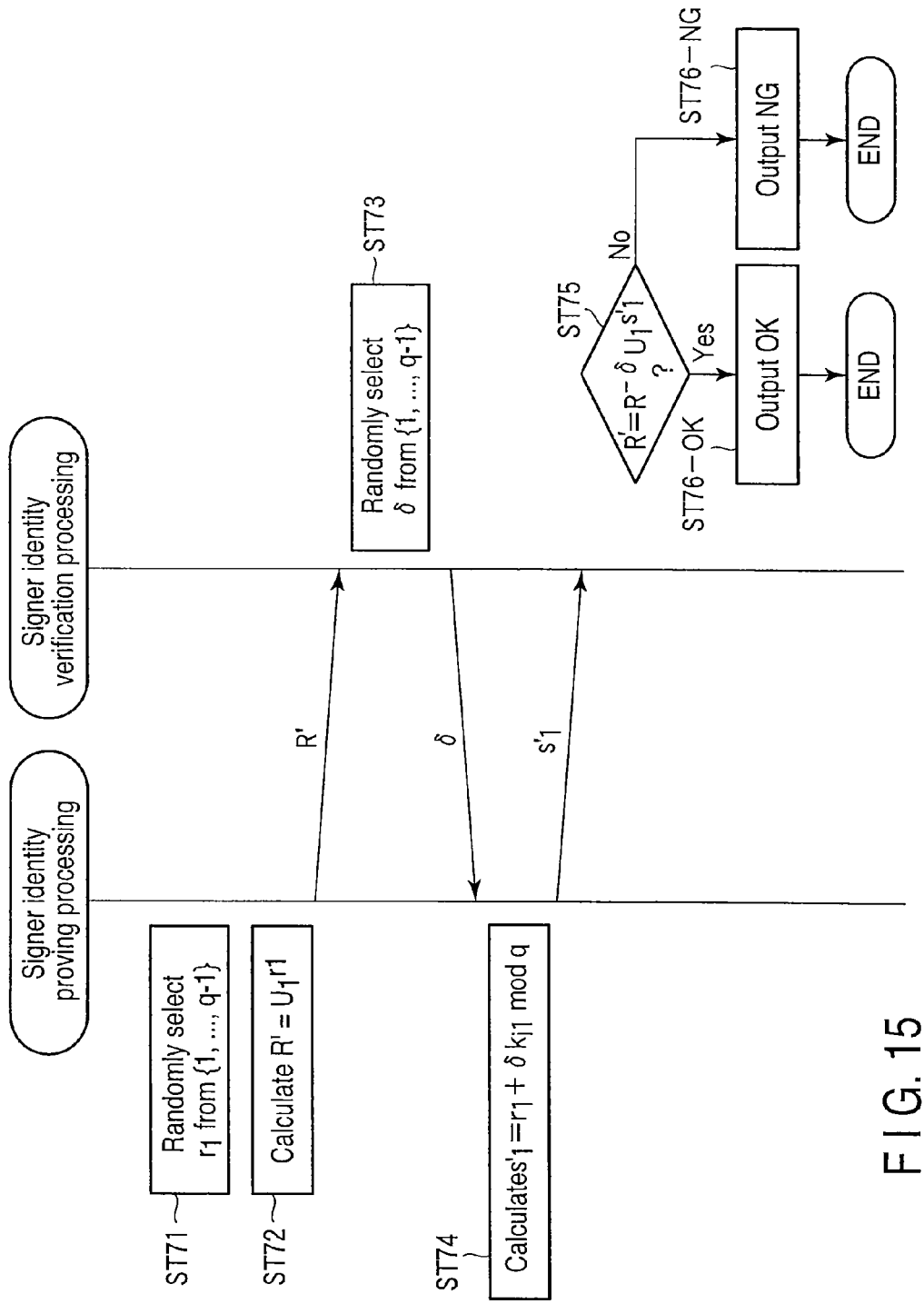
F I G. 15

| | Usual signature | Group signature | | | |
|---|---|---|---|---|---|
| | Conventional | Conventional [CG04] | | Present Embodiment | |
| | RSA | Basic | VLR | Zp* | Elliptic curve |
| Signature generating calculation amount | 512 | 4180 | 4462 | | 2016 |
| Signature verifying calculation amount | Small | 2310 | 2592 | | 896 |
| Signature length | 2048 | 12426 | 14976 | 11136 | 2021 |
| Signature key length | 4096 | 4438 | 4720 | | 448 |
| Verification key length | ≈ 2048 | 16666 | 18714 | 12288 | 1350 |
| Group private key length | - | | 282 | | 448+1120 |

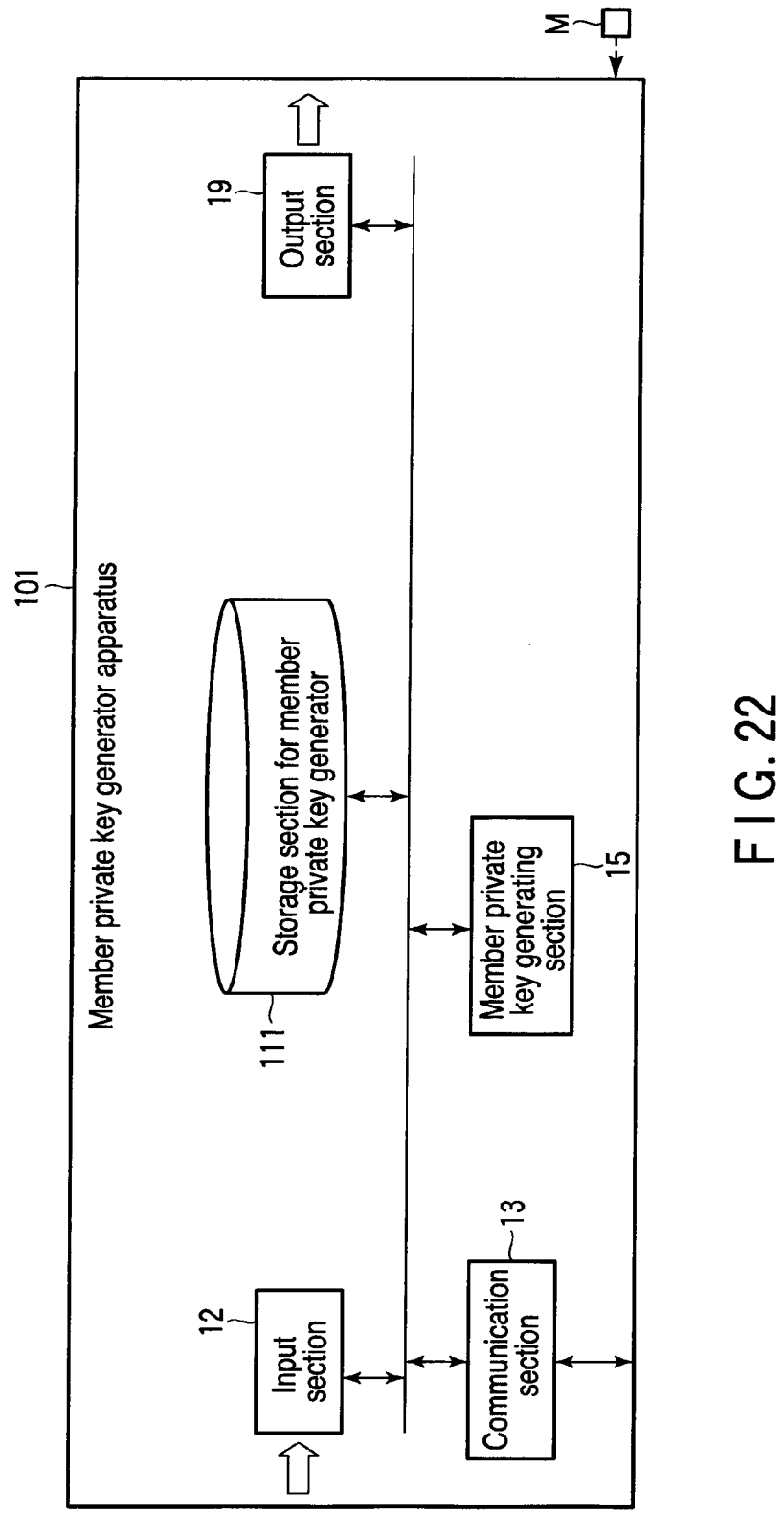
F I G. 22

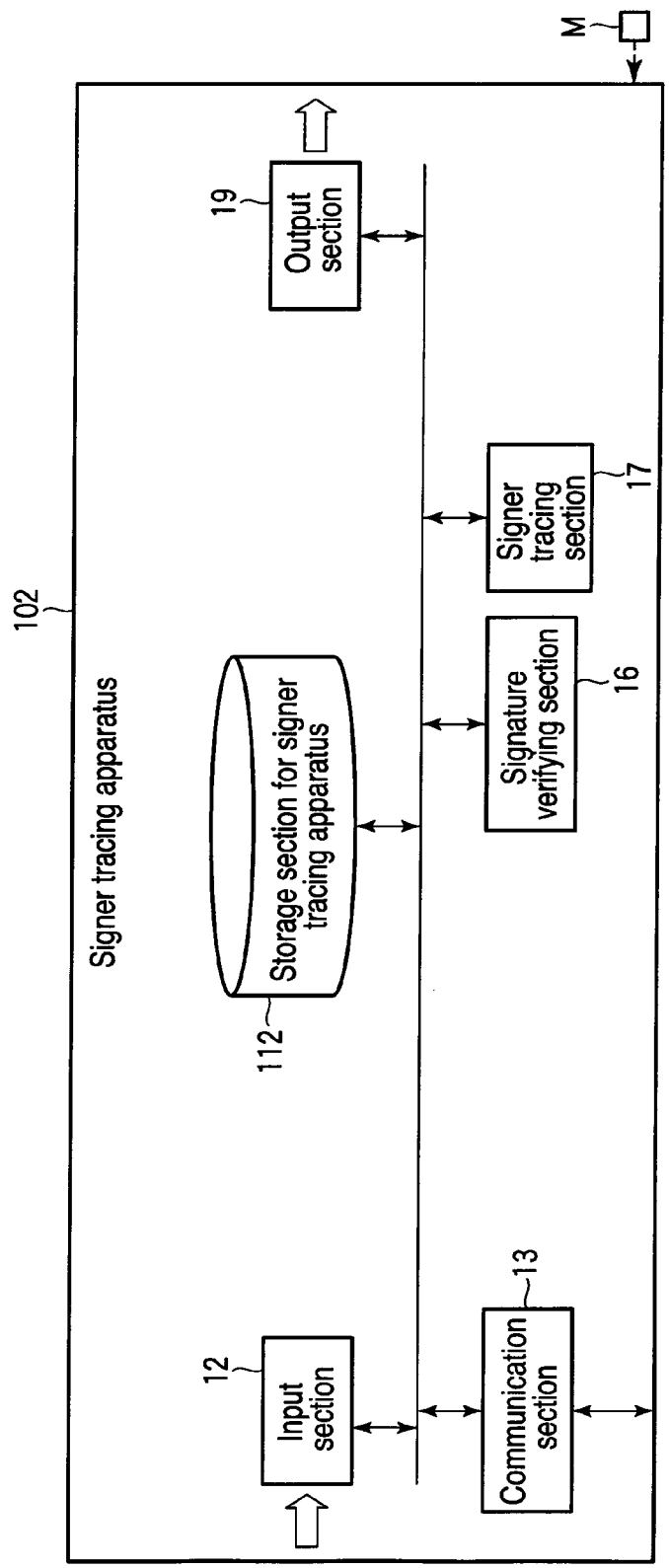
F I G. 24

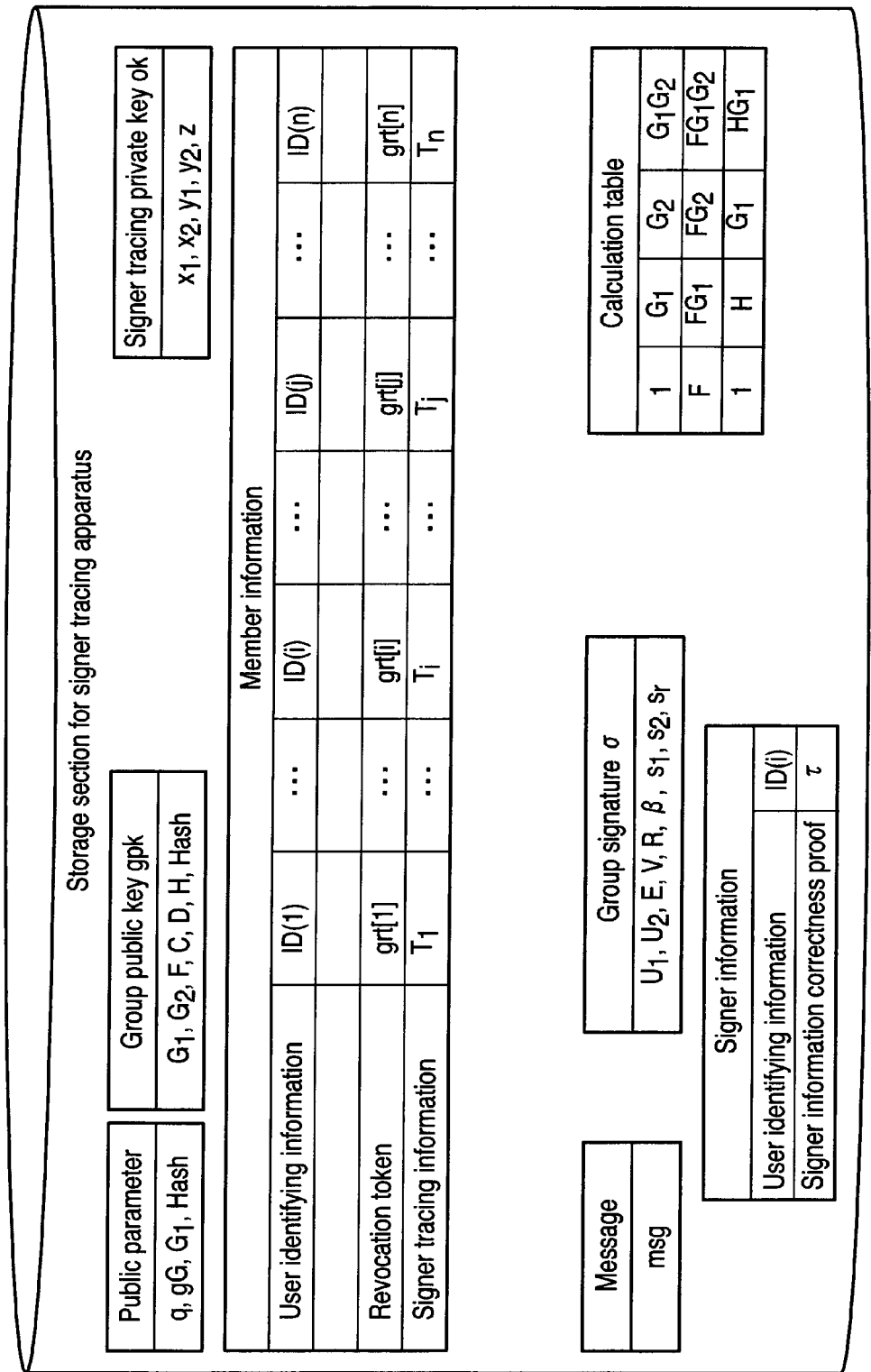
F I G. 25

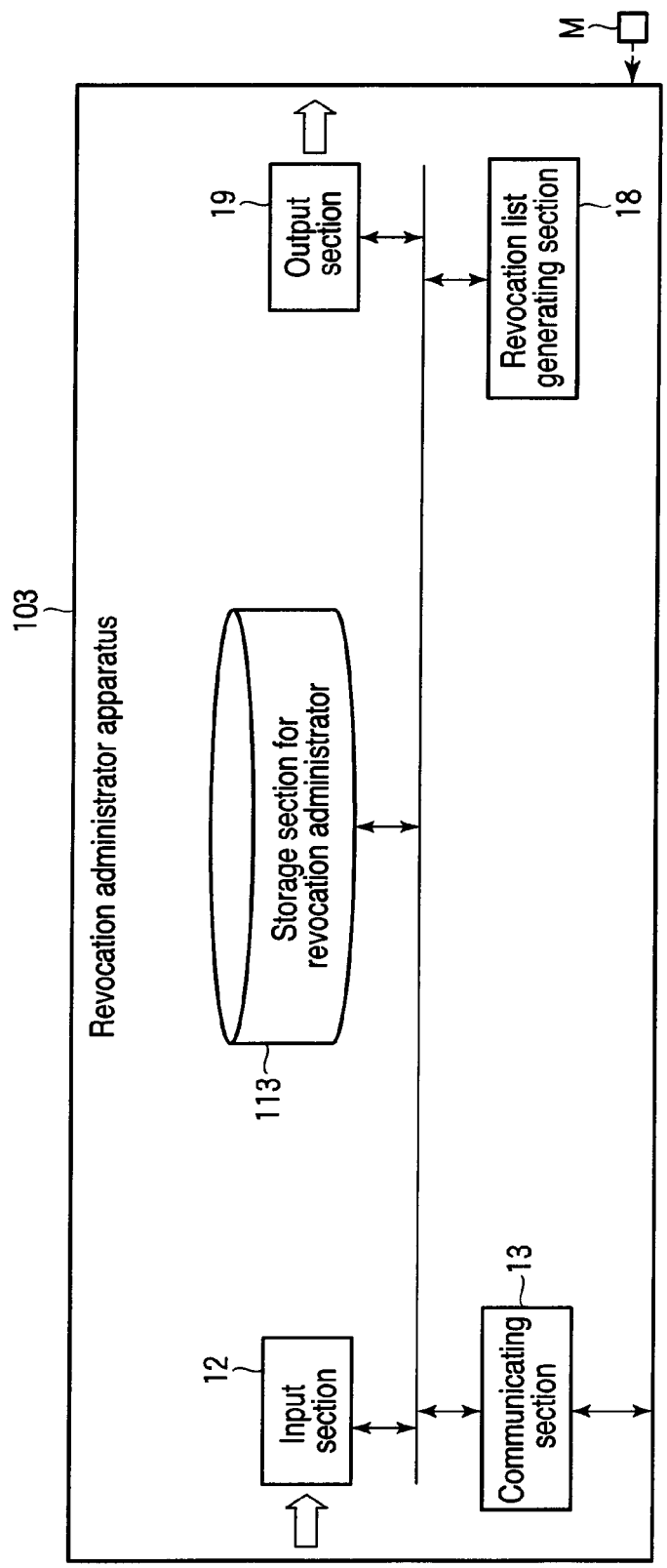
F I G. 26

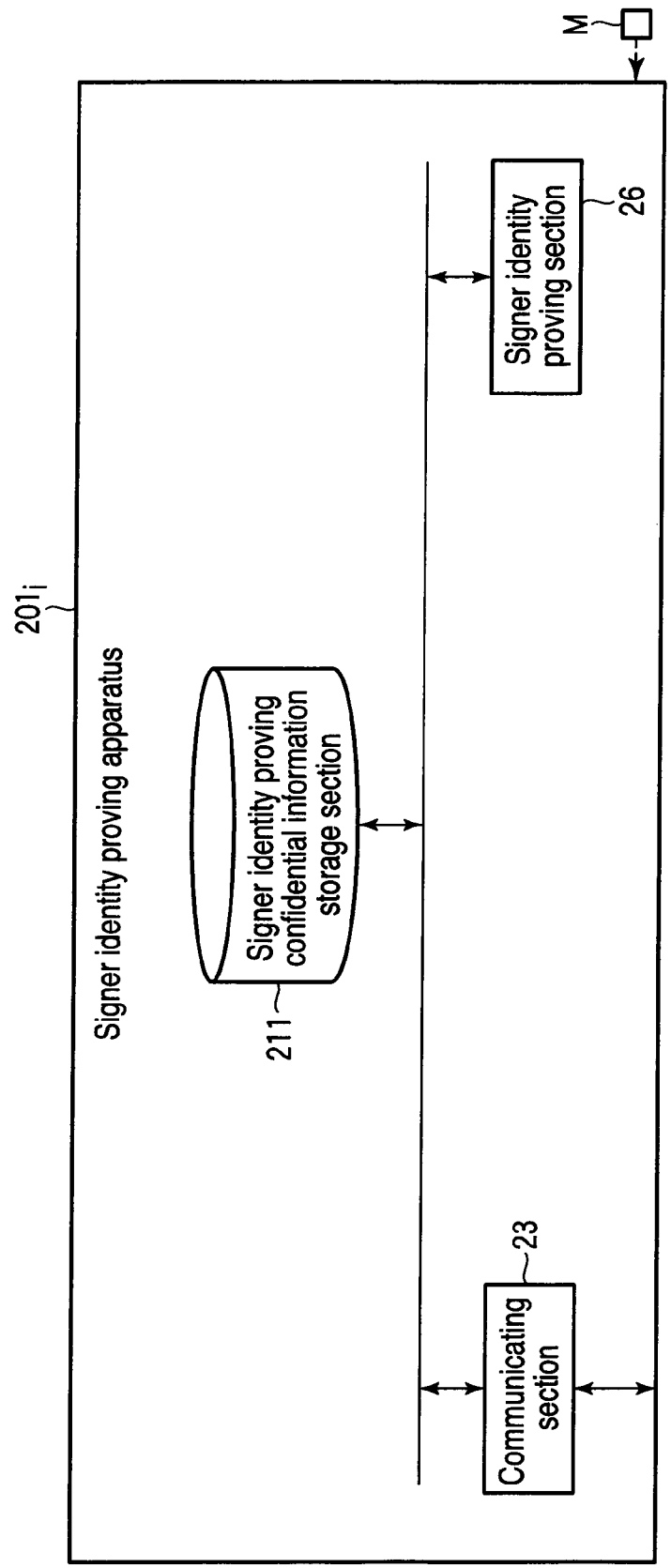
F I G. 28

GROUP SIGNATURE SYSTEM, APPARATUS AND STORAGE MEDIUM

CROSS REFERENCE TO RELATED APPLICATIONS

This is a Continuation Application of PCT Application No. PCT/JP2009/054502, filed Mar. 10, 2009, which was published under PCT Article 21(2) in Japanese.

This application is based upon and claims the benefit of priority from prior Japanese Patent Application No. 2008-072488, filed Mar. 19, 2008, the entire contents of which are incorporated herein by reference.

BACKGROUND OF THE INVENTION

1. Field of the Invention

The present invention relates to a group signature system, an apparatus and a storage medium, and more particularly, it relates to a group signature system, an apparatus and a storage medium which can decrease a calculation amount to improve a calculation speed.

2. Description of the Related Art

A group signature system in which electronic signatures have anonymity was suggested by Chaum et al. in 1991. In a usual electronic signature system, a public key for verifying a signature corresponds to a private key for generating the signature in a relation of one to one, and hence the anonymity of a signature generator cannot be kept.

On the other hand, in the group signature system, a group public key for verifying the signature corresponds to member private keys for generating the signatures in a relation of one to n, and hence the anonymities of signature generators are kept. That is, in the group signature system, one group public key corresponds to n member private keys, and in consequence, the signature generator cannot be specified at a time of the signature verification owing to its properties. Moreover, the group signature system has properties such that only a group administrator who is a privileged person can specify a signer.

In an initial group signature system, however, the length of the signature or a calculation amount for generating the signature is proportional to the number of members. Therefore, the system has a very poor efficiency for a group including a large number of members, and is thus not suitable for a realization.

Meanwhile, a group signature system whose efficiency which does not depend on the number of members was suggested by Camenisch et al. in 1997. In this system, the signature of a group administrator with respect to each member private key is used as a membership certificate. The group signature includes the membership certificate (or a portion thereof) encrypted by the public key of the group administrator, and a non-interactive knowledge proof indicating that the membership certificate is correctly encrypted and the member private key and the membership certificate are held. A signature verifier can verify the signature of the member by the verification of the non-interactive knowledge proof. Furthermore, the group administrator can specify a signer by decrypting the membership certificate. The concept of using such a membership certificate is the key basis for the subsequent group signature systems.

However, in the system of Camenisch et al., the efficiency does not depend on the number of the members, but the efficiency is poor from a practical viewpoint.

The first practical group signature system is a system suggested by Ateniese et al. in 2000 (hereinafter referred to as the [ACJT00] system). The Ateniese group signature system has a noticeably enhanced efficiency, and can accordingly be investigated to be put to practical use. The Ateniese group signature system requires a calculation amount about 200 times that of RSA signature generation during signature generation, and hence the improvement thereof is continued to be investigated. The security of the Ateniese system builds on the strong-RSA problem.

At present, three high speed group signature systems are known, as follows. One of them is a system suggested by Camenisch et al. in 2004 (e.g., see J. Camenisch and J. Groth, "Group Signatures: Better Efficiency and New Theoretical Aspects", Forth Int. Conf. on Security in Communication Networks—SCN 2004, LNCS 3352, pp. 120 to 133, 2005. This will hereinafter be referred to as the [CG04] system. The full paper can be acquired from the URL http://www.brics.dk/~jg/ (as of March 2008)). The signature generating calculation amount of the [CG04] system is decreased to be about eight times that of RSA signature generation. The security of the [CG04] system also builds on the strong-RSA problem. The second is a system suggested by Furukawa et al. in 2005 (e.g., see J. Furukawa and H. Imai, "An Efficient Group Signature Scheme from Bilinear Maps", ACISP 2005, LNCS 3574, pp. 455 to 467, 2005. This will hereinafter be referred to as the [FI05] system). The third is a system suggested by Delerablee et al. (e.g., see C. Delerablee and D. Pointcheval, "Dynamic Fully Anonymous Short Group Signatures", VIETCRYPT, LNCS 4341, pp. 193 to 210, 2006. This will hereinafter be referred to as the [DP06] system). The [FI05] and [DP06] systems utilize a bilinear image, and the security of each system builds on a presumption in a bilinear group.

Improvements have been made to the speed and the functions of the group signature system, a key function of which is the revocation function. Revocation is a key function for canceling memberships from services or forcibly eliminating illegal memberships, when developing the services utilizing group signatures. Each of the above [CG04], [FI05] and [DP06] systems has the revocation function.

As a method for realizing a higher security and flexible group administration, there has been investigated a system which can vary confidential information to be handled for each group administrating function to divide authorities. Specifically, there is considered a system where functions of generating a member private key, specifying signers and revoking the signers, respectively, which have heretofore been performed all by a group administrator, are divided by a member private key generator, a signer specifier and a revocation administrator in charge.

Moreover, a property referred to as non-frameability is also suggested in which a verifier can confirm that the signer is appropriately specified by the group administrator or the signer specifier.

Furthermore, a property referred to as self-traceability is also suggested in which it can be proved with respect to the verifier that a certain signature is generated by the signer only when this is desired by the signer.

BRIEF SUMMARY OF THE INVENTION

According to the investigation of the present inventor, there is room for decreasing a calculation amount to improve a calculation speed while providing a revocation function as compared with [CG04], [FI05] and [DP06] systems.

An object of the present invention is to provide a group signature system, an apparatus and a storage medium which can decrease a calculation amount to improve a calculation speed while realizing a revocation function.

One aspect of the present invention is a group signature system comprising a group administrator apparatus, a signer apparatus and a verifier apparatus which are configured to communicate with one another and which use a group signature method, wherein the group administrator apparatus comprises: a parameter storage device configured to store a public parameter including a prime order q used in the group signature method and a generator $G_1$ of a multiplication cyclic group gG of the above q; a group key generation device configured to generate a group private key including values a and b∈$Z_q^*$, and a group public key including values $G_2$ and F satisfying a first relational equation $G_2=G_1^a$ and a second relational equation $F=G_1^b$ and the generator $G_1$, based on the public parameter in the parameter storage device; a member private key generation device configured to calculate a member private key including representation parts $k_{i1}$ and $k_{i2}$ satisfying a fourth relational equation $F=G_1\hat{}\{k_{i1}\}G_2\hat{}\{k_{i2}\}$, based on the group private key, the group public key and a third relational equation $k_{i1}=b-ak_{i2}$ mod q (with the proviso that ^ is a symbol indicating an exponentiation); a signer tracing information calculating device configured to calculate signer tracing information $T_i=G_1\hat{}\{k_{i1}\}$ based on the member private key and the generator $G_1$; a revocation list generation device configured to generate a revocation list including the part $k_{i1}$ of the representation corresponding to a revoked member; and a device configured to transmit the revocation list to the verifier apparatus, the signer apparatus comprises: a storage device for a signer in which a public parameter including a prime order q used in the group signature method and a generator $g_1$ of a multiplication cyclic group gG of the above q, the group public key, the member private key, the signer tracing information $T_i$ and a message are stored; a ciphertext generation device configured to encrypt the signer tracing information $T_i$ based on the public parameter and the group public key in the storage device for the signer to generate ciphertext data of the signer tracing information $T_i$; a zero-knowledge proof generation device configured to generate a zero-knowledge proof indicating that the member private key is known and that the ciphertext data is correctly generated based on the signer tracing information $T_i$, based on the public parameter, the group public key, the member private key and the message in the storage device for the signer and the ciphertext data of the signer tracing information $T_i$; and a device configured to transmit, to the verifier apparatus, a group signature including the ciphertext data and the zero-knowledge proof, and the message, and the verifier apparatus comprises: a storage device for a verifier in which a public parameter including a prime order q used in the group signature method and a generator $g_1$ of a multiplication cyclic group gG of the above q and the group public key are stored; a device configured to receive the revocation list from the group administrator apparatus and receiving the group signature and a message from the signer apparatus, respectively; a verification device configured to verify the correctness of the group signature based on the received revocation list, group signature and message, and the public parameter and group public key in the storage device for the verifier; and a device configured to transmit the verified result to the signer apparatus.

According to the first aspect, there is provided the group signature system based on a complete discrete logarithm in which the multiplication cyclic group gG of prime order q is used. Moreover, the group signature system is realized so that the representation parts $k_{i1}$ and $k_{i2}$ constitute the member private key and so that the part $k_{i1}$ of the representation of the revoked member is included in the revocation list. In consequence, as compared with conventional [CG04], [FI05] and [DP06] systems, a calculation amount can be decreased to increase a calculation speed. Further, in the group signature of the present invention, the group administrator function can be divided by the member private key generator, the signer tracer and the revocation administrator, whereby weak non-frameability obtained by slightly weakening conventional non-frameability and self-traceability can simultaneously be realized.

It is to be noted that in the above aspect, 'the system' constituted of apparatuses is represented, but the present invention is not limited to this representation, and may be represented by 'the apparatus' which is a set of apparatuses or which indicates each apparatus, 'a program', 'a computer-readable storage medium' or 'a method'.

BRIEF DESCRIPTION OF THE SEVERAL VIEWS OF THE DRAWING

FIG. 2 is an exemplary diagram showing the constitution of a group administrator apparatus in the embodiment;

FIG. 3 is an exemplary diagram showing the constitution of a storage section for a group administrator in the embodiment;

FIG. 4 is an exemplary diagram showing the constitution of a signer apparatus in the embodiment;

FIG. 6 is an exemplary diagram showing the constitution of a verifier apparatus in the embodiment;

FIG. 12 is a flowchart for explaining the calculation processing of a zero-knowledge proof in the embodiment;

FIG. 14 is a flowchart for explaining revoke verification processing in the embodiment;

FIG. 15 is a sequence diagram for explaining signer identity proof/verification processing in the embodiment;

FIG. 22 is an exemplary diagram showing the constitution of a member private key generator in the embodiment;

FIG. 24 is an exemplary diagram showing the constitution of a signer tracing apparatus in the embodiment;

FIG. 25 is an exemplary diagram showing the constitution of a storage section for the signer tracing apparatus in the embodiment;

FIG. 26 is an exemplary diagram showing the constitution of a revocation administrator apparatus in the embodiment;

FIG. 28 is an exemplary diagram showing the constitution of a signer identity proving apparatus in the embodiment.

DETAILED DESCRIPTION OF THE INVENTION

Figure 1:
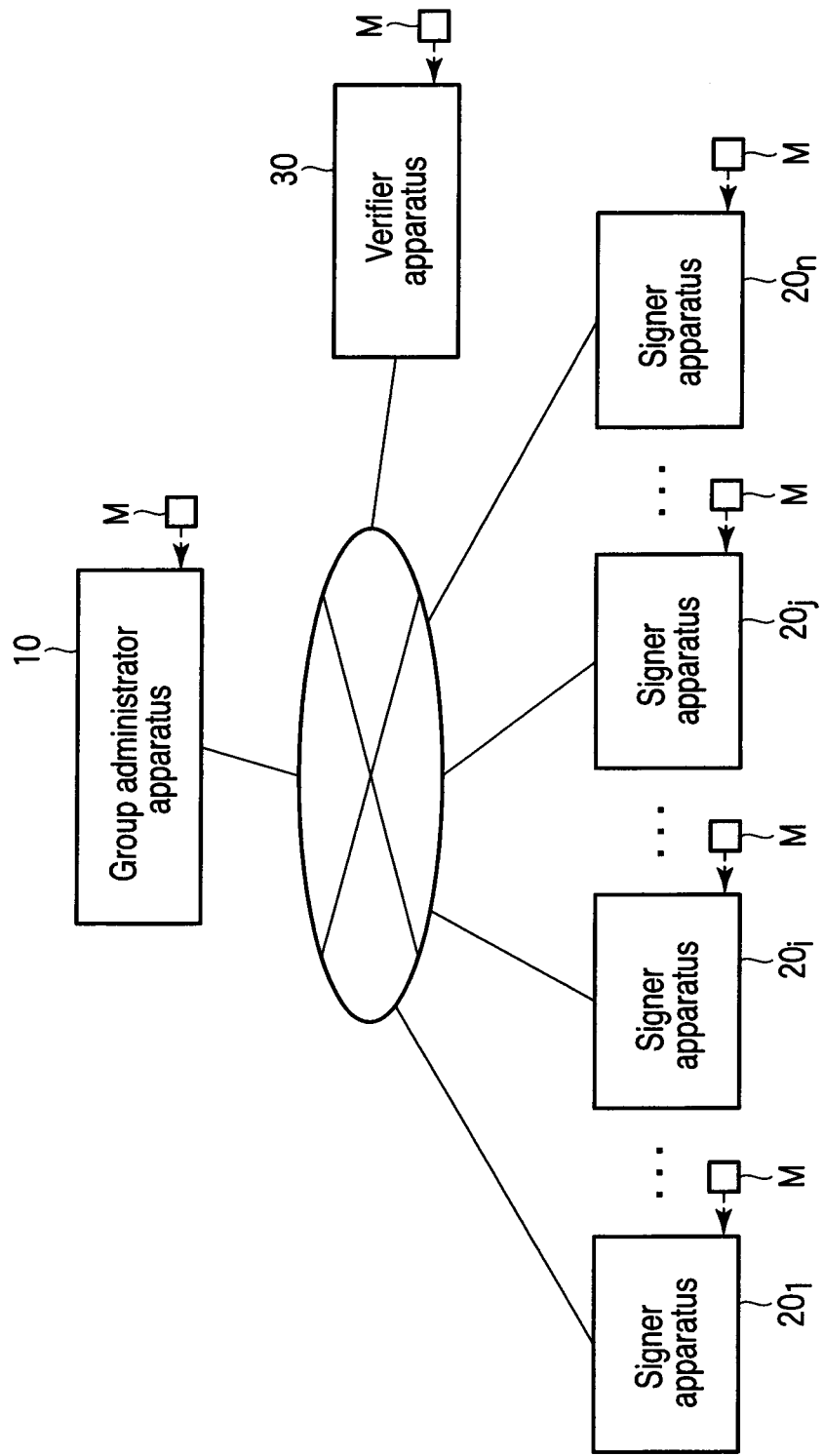
FIG. 1 is an exemplary diagram showing the constitution of a group signature system according to one embodiment of the present invention.

Hereinafter, one embodiment of the present invention will be described in detail with reference to the drawings. Prior to the description, the outline of a group signature system according to one embodiment of the present invention (hereinafter referred to as the embodiment system) will be described.

The most striking feature of the system of the embodiment is its remarkably excellent efficiency. When using a simultaneous multiple exponentiation method, which is a technique for performing modular exponentiation at a high speed, the calculation amount of the [CG04] system is eight or more times that of RSA signature generation, whereas in the embodiment system, the signature generation can be performed with a calculation amount which is only about four times that of the RSA signature generation. Moreover, in the simultaneous multiple exponentiation method, the prior calculation of a table needs to be performed in accordance with a base value, but in the embodiment system, the base of the modular exponentiation is constantly fixed. In consequence, the advance calculation of the table does not have to be performed every time. Moreover, the table can be held to further slightly decrease the calculation amount. It is to be noted that in the [FI05] and [DP06] systems utilizing a bilinear image, when the bilinear image is mounted, a calculation speed noticeably varies, and hence the embodiment system cannot simply be compared with such systems. However, even if the quickest bilinear image mounting technology presently available is taken into consideration, these systems have the same level of speed as the [CG04] system, and hence the embodiment system has a sufficiently higher speed.

Further, in the embodiment system, a member private key used for the signature generation is very short, and the bit length of the key is only ⅒ of that of the [CG04] system and ⅑ of that of the RSA system.

The security of the [ACJT00] system or the [CG04] system builds on the strong-RSA problem, and the securities of the [FI05] and [DP06] systems build on the presumption in a bilinear group. On the other hand, the security of the embodiment system builds on the decisional Diffie-Hellman (DDH) problem. Consequently, the embodiment system can efficiently be mounted on an elliptic curve, and a signature length and a key length can noticeably be shortened, which enables speedup. The embodiment system is the first efficient group signature system based solely on the DDH problem. Furthermore, in the embodiment system, a simple calculation combination can be mounted, and hence application over a broad range of platforms can be expected.

It is to be noted that in the embodiment system, a group administrator function can be divided by a member private key generator, a signer tracer and a revocation administrator, whereby weak non-frameability obtained by slightly weakening conventional non-frameability and self-traceability can simultaneously be realized.

<Group Signature>

Hereinafter, the function and security of the group signature system as the assumption of the embodiment system will be defined.

[Function of Group Signature]

The existing efficient systems mostly utilize the signature of a group administrator with respect to the member private key as a membership certificate. In the embodiment system, no group administrator signature is utilized, and hence a term 'signer tracing information' is used to distinguish the information from the membership certificate of the conventional system. The group signature includes encrypted signer tracing information, a non-interactive knowledge proof indicating that the signer tracing information is correctly encrypted, and a non-interactive knowledge proof indicating that the member private key and the signer tracing information are held, in the same manner as in the system utilizing the membership certificate.

A group signature system GS include eight polynomial time algorithms GKg, MKg, GSig, GVf, Claim, Open, Judge and Revoke as follows.

[Group Key Set Generation Algorithm GKg]

A group key set generation algorithm GKg is a stochastic polynomial time algorithm to be executed by the group administrator to input a security parameter k and to generate and output a group public key gpk, a member private key generating private key ik and a signer tracing private key ok.

[Member Private Key Generation Algorithm MKg]

The maximum number of members in a group is n, and member IDs are 1, . . . , n. A member private key generation algorithm MKg is a stochastic polynomial time algorithm to be executed by the group administrator or a member private key generator to input the group public key gpk, the member private key generating private key ik and member ID= i∈{1, . . . , n} and to generate and output a member private key gsk[i], signer tracing information $T_i$ corresponding to the key and a revocation token grt[i].

[Signature Generation Algorithm GSig]

A signature generation algorithm GSig is a stochastic polynomial time algorithm to be executed by a signer to input the group public key gpk, the member private key gsk[i], the signer tracing information $T_i$ and a message msg and to generate and output a group signature σ.

[Signature Verification Algorithm GVf]

A signature verification algorithm GVf is a stochastic polynomial time algorithm to be executed by a verifier to input the group public key gpk, the message msg, the group signature σ and a revocation list RL and to output 'valid' when the signature is correct or to output 'invalid' when the signature is not correct.

[Signature Generation Proof Algorithm Claim]

A signature generation proof algorithm Claim is a bilateral interactive protocol between the signer and the verifier for realizing the self-traceability. The group public key gpk, the message msg and the group signature σ are common inputs to the two, and the member private key gsk[i] is given as confidential information for the signer. At the end of the protocol, the verifier outputs 'true' or 'false' indicating whether or not the group signature σ has been generated by the signer who has executed the interactive protocol.

[Signer Tracing Algorithm Open]

A signer tracing algorithm Open is a stochastic polynomial time algorithm to be executed by the group administrator or the signer tracer to input the group public key gpk, a group private key gmsk, the message msg and the group signature σ and to output ID=i of a user which has generated the signature and a signer information correctness proof τ when the signature is correct or to output 'invalid' when the signature is not correct. It is to be noted that the group private key gmsk is constituted of member private key generating private keys ik (a,b) and signer tracing private keys ok($x_1$, $x_2$, $y_1$, $y_2$, z).

[Signer Tracing Result Verification Algorithm Judge]

A signer tracing result verification algorithm Judge is a stochastic polynomial time algorithm to be executed by the verifier to input the group public key gpk, the group signature σ, ID=i of the user traced from the signature and the signer information correctness proof τ and to output 'true' or 'false' indicating whether or not the signer tracing has correctly been performed.

[Member Revoke Algorithm Revoke]

A member revoke algorithm Revoke is a stochastic polynomial time algorithm to be executed by the group administrator or the revocation administrator to input a set grt_set of revocation tokens and a set RU of the IDs of the revoked users and to generate and output the revocation list RL.

[Security of Group Signature]

A number of requirements have first been defined with respect to the security of the group signature. Afterward, Bellare et al. summarize the requirements of the securities of the group signatures of a static group and a dynamic group. It is to be noted that the static group is defined as a group which does not have any member adding/deleting function, whereby once a group is generated, no member is changed. The dynamic group is defined as a group having member change. Here, in Bellare's requirements, the security with respect to the coalition of all the group members is very strictly taken in to consideration. Therefore, Bellare's requirements are usually weakened to define the security. Here, the security of a case where there is no coalition between the group administrator and the members is redefined based on Bellare's requirements.

It is considered that when the group signature system GS has four properties, i.e., correctness, anonymity, traceability and weak non-frameability, the system is secure.

[1. Correctness]

GVf(gpk, msg, GSig(gsk[i], msg))=valid, and

Open(gmsk, msg, GSig(gsk[i], msg))=i

That is, when the signature is correctly generated, the signature is successfully verified by the signature verification algorithm GVf, and the signer can be traced by the signer tracing algorithm Open.

[2. Anonymity]

Attacks are considered as follows.

(1) Setup: A key generation algorithm GKg($1^k$) is executed, and the member private key generation algorithm MKg is executed with respect to i∈{1, ..., n} to generate the group public key gpk, the member private key generating private key ik, the signer tracing private key ok, a set gsk_set of the member private keys, a set T_set of the signer tracing information and the set grt_set of the revocation tokens, thereby giving gps, T_set and gsk[u] to an adversary A.

(2) Queries: The adversary A may put arbitrary queries with respect to GSig, Open, Revoke and Claim.

(3) Challenge: The adversary A outputs the message msg and the user IDs i0 and i1. At this time, u=i0 or u=i1 cannot be output. A challenger randomly selects the user ID b←{0, 1}, and calculates the group signature σ*4←GSig(gpk, gsk[ib], msg) to return it to the adversary A.

(4) Restricted Queries: The adversary A may put arbitrary queries with respect to GSig, Open, Revoke and Claim except two restrictions (a) and (b): (a) any query cannot be put against Revoke with respect to i0 or i1; and (b) any query cannot be put against Open or Claim with respect to σ.

(5) Output: The adversary A outputs b'.

It is considered that when a probability |Pr[b=b']−1/2| can be ignored with respect to all the polynomial time algorithms A, the group signature system has anonymity.

[3. Traceability]

Attacks are considered as follows.

(1) Setup: The key generation algorithm GKg($1^k$) is executed, and the member private key generation algorithm MKg is executed with respect to i∈{1, ..., n} to generate the group public key gpk, the member private key generating private key ik, the signer tracing private key ok, the set gsk_set of the member private keys, the set T_set of the signer tracing information and the set grt_set of the revocation tokens, thereby giving gps, ok, grt_set,T_set and gsk[u] to the adversary A.

(2) Queries: The adversary A may put arbitrary queries with respect to GSig and Claim.

(3) Response: The adversary A outputs a message msg* and a group signature σ*. It is considered that when the result of the signer tracing algorithm Open is Open(gmsk, msg*, σ*)=i≠u and i and msg* are not designated in the signing query, "the adversary A has succeeded in the attack". It is considered that when the success probabilities of all the polynomial time algorithms A can be ignored, the group signature system has traceability.

[4. Weak Non-Frameability]

In the definition of the non-frameability by Bellare et al., even injustice by the group administrator or the member private key generator is taken into consideration, but in the present invention, the injustice is not taken into consideration, and the definition is weakened to consider the weak non-frameability as follows.

Attacks are considered as follows.

(1) Setup: The key generation algorithm GKg($1^k$) is executed, and the member private key generation algorithm MKg is further executed with respect to i∈{1, ..., n} to generate the group public key gpk, the member private key generating private key ik, the signer tracing private key ok, the set gsk_set of the member private keys, the set T_set of the signer tracing information and the set grt_set of the revocation tokens, thereby giving gpk, ok, grt_set, T_set and gsk[u] to the adversary A.

(2) Queries: The adversary A may put arbitrary queries with respect to GSig and Claim.

(3) Response: The adversary A outputs the message, msg*, the group signature σ*, the user ID=i* and the signer information correctness proof τ*.

It is considered that when the result of the signature verification algorithm GVf is GVf(gpk, msg*, σ*)=valid, i*≠u and Judge(gpk, i*, msg*, σ*, τ*)=true and i* and msg* are not designated in the signing query, "the adversary A has succeeded in the attack". It is considered that when the success probabilities of all the polynomial time algorithms A can be ignored, the group signature system has weak non-frameability.

<Preparation>

Hereinafter, the decisional Diffie-Hellman (DDH) problem, representation and Cramer-Shoup cipher, which are important in understanding the GSig, Open, Revoke and Claim, will be described.

[DDH Problem]

The multiplication cyclic group of a prime order q is defined as G. The distribution of random quadruples ($G_1$, $G_2$, $U_1$, $U_2$)∈$gG^4$ is defined as R. $G_1$, $G_2$∈G and r∈$Z_q$ are randomly selected, and the distribution of the quadruples ($G_1$, $G_2$, $U_1$, $U_2$)$\in gG^4$ in which $U_1=G^r$ and $U_2=G^r$ is defined as D. At this time, such a problem as to judge whether the arbitrarily given quadruples ($G_1$, $G_2$, $U_1$, $U_2$) belong to distribution R or D is referred to as the DDH problem. The security of the embodiment system results in the difficulty of the DDH problem.

It is to be noted that if a discrete logarithm problem can be resolved, the Diffie-Hellman (DH) problem can be resolved. If the DH problem can be resolved, the DDH problem can be resolved. In the DH problem, $G^{xy}$ is calculated from given G, $G^x$ and $G^y$. In the discrete logarithm problem, x is calculated from the given G and $G^x$. It is believed that it is difficult to resolve any one of these DDH, DH and discrete logarithm problems.

[Representation]

In the calculation on the multiplication cyclic group G, ($e_1$, $e_2$, ..., $e_k$) satisfying $H=G_1\hat{\ }\{e_1\}G_2\hat{\ }\{e_2\} \ldots G_k\hat{\ }\{e_k\}$ is referred to as the representation of H in which $G_1, G_2, \ldots, G_k$ are defined as bases. It is to be noted that "ˆ" is a symbol indicating an exponentiation.

The representation was used as a relaxed discrete log (RDL) also in the field of cipher theory a long time ago, and has since been used often. The Camenisch system of 1997 uses the non-interactive knowledge proof of the representation to which Schnorr signature is applied. In the embodiment system, the member private key is used as the representation, and the group signature includes the non-interactive knowledge proof concerning the representation.

[Cramer-Shoup Cipher]

In the embodiment system, the Cramer-Shoup cipher is utilized for encrypting the signer tracing information. However, the embodiment system is not limited to the Cramer-Shoup cipher.

Hereinafter, the Cramer-Shoup cipher will be described.

[Generation of Pair of Public Key and Private Key]

As a public parameter, the multiplication cyclic group gG of the prime order q, its generator $G_1$ and a universal one-way hash function are input to perform processing as follows.

(1) $G_1$ and $G_2 \in gG$ are randomly selected.

(2) $x_1$, $x_2$, $y_1$, $y_2$ and $z \in Z_q^*$ are randomly selected.

(3) $C=G_1\hat{\ }\{x_1\}G_2\hat{\ }\{x_2\}$, $D=G_1\hat{\ }\{y_1\}G_2\hat{\ }\{y_2\}$ and $H=G_1^z$ are calculated.

(4) The hash function Hash is selected from a set of universal one-way hash functions.

(5) The public key pk=($G_1$, $G_2$, C, D, H, Hash) and private key sk=($x_1$, $x_2$, $y_1$, $y_2$, z) are output.

[Encryption]

The public key pk=($G_1$, $G_2$, C, D, H, Hash) and the message $m \in G$ are input to perform processing as follows.

(1) $r \in Z_q^*$ is randomly selected.

(2) $U_1=G_1^r$, $U_2=G_2^r$ and $E=H^r m$ are calculated.

(3) $\alpha=\text{Hash}(U_1, U_2, E)$ is calculated.

(4) $V=C^r D^{r\alpha}$ is calculated.

(5) Ciphertext ($U_1$, $U_2$, E, V) is output.

[Decryption]

The ciphertext ($U_1$, $U_2$, E, V) is input to perform processing as follows.

(1) $\alpha=\text{Hash}(U_1, U_2, E)$ is calculated.

(2) It is verified whether or not $U_1\hat{\ }\{x_1+y_1\alpha\}U_2\hat{\ }\{x_2+y_2\alpha\}=V$ is established. When it is verified that the verification formula is not established, the ciphertext is rejected as an invalid, thereby ending the processing.

(3) $m=E/U_1^z$ is calculated, and output as a plain text.

The processing of Cramer-Shoup cipher has been described above.

<Outline of Embodiment System>

Next, the outline of the embodiment system will be described.

In the present embodiment, the speedup of the group signature system is achieved by a system based on a discrete logarithm. This is because in a system based on RSA, an exponent is long, and hence the non-interactive knowledge proof has a poor efficiency in a group in which an order number is not known. Therefore, the overall efficiency is also poor. It is to be noted that [ACJT00] or [CG04] system is also the system based on RSA, and hence has poor efficiency as compared with the embodiment system.

In addition, the [ACJT00] system is the system based on RSA, whereas a part of the [CG04] system is based on the discrete logarithm to noticeably improve efficiency, but a portion based on the RSA is also left. On the other hand, the embodiment system is entirely based on the discrete logarithm to achieve the speedup.

In the embodiment system, the representation is further used as the member private key. When the discrete logarithm is the private key, only one private key is possessed with respect to one public key. On the other hand, when the representation is the private key, a plurality of private keys can be produced with respect to one public key, and hence the system is suitable for a group including a large number of members. Also, in a system of Kiayias et al., the representation is used, but the representation itself is used as the signer tracing information, and hence the system has a poor efficiency.

On the other hand, in the embodiment system, the representation itself is not used, but a value uniquely calculated from the representation is used as the signer tracing information, and hence the system has a high efficiency.

(First Embodiment)

FIG. 1 is an exemplary diagram showing a constitution of a group signature system according to one embodiment of the present invention. This group signature system comprises one group administrator apparatus 10, n signer apparatuses $20_1, \ldots, 20_i, \ldots, 20_j, \ldots$ and $20_n$ and one verifier apparatus 30 so that the apparatuses can communicate with one another. For each of the apparatuses 10, $20_1, \ldots, 20_n$ and 30, a hardware constitution or a combined constitution of a hardware resource and software can be carried out. As the software of the combined constitution, a program is used which is beforehand installed from a network or storage medium M to a computer of the corresponding apparatus to realize the function of the corresponding apparatus. Moreover, the signer apparatuses $20_1, \ldots$ and $20_n$ have the same hardware constitution, and hence in the description, the i-th signer apparatus $20_i$ will representatively be described. Moreover, in the group signature system of the present embodiment, as shown in one example described later with reference to FIGS. 8 to 15, Cramer-Shoup cipher is used for an encryption system, and a system to which Schnorr signature is applied is used for a zero-knowledge proof system, but the present invention is not limited to these encryption and zero-knowledge proof systems. That is, the group signature system of the present embodiment is not limited to the system shown in FIGS. 8 to 15, and the system can be realized even by using another encryption system or another zero-knowledge proof system.

Here, as shown in FIG. 2, the group signature administrator apparatus 10 comprises a storage section 11 for a group administrator, an input section 12, a communicating section 13, a group key generating section 14, a member private key generating section 15, a signature verifying section 16, a signer tracing section 17, a revocation list generating section 18 and an output section 19.

The storage section 11 for the group administrator is a storage device accessible from the sections 12 to 18, and as shown in FIG. 3, a public parameter, a group public key gpk, a member private key generating private key ik, a signer tracing private key ok, member information, user administrating information, a calculation table, a message, a group signature and signer information are stored.

The public parameter includes at least a prime order q used in the group signature system, and a generator $G_1$ of a multiplication cyclic group gG of q, and here a hash function Hash is further included.

The member private key generating private key ik includes at least a value a or $b \in Z_q^*$ selected based on the public parameter.

The signer tracing private key ok includes at least a decrypting private key of the encryption system, and here includes values $x_1$, $x_2$, $y_1$, $y_2$ and $z \in Z_q^*$.

The group public key gpk includes at least values $G_2$ and F and the generator $G_1$ satisfying a first relational equation $G_2 = G_1^a$ and a second relational equation $F = G_1^b$, and further includes values C, D, H and the hash function Hash here. It is to be noted that $C = G_1\hat{}\{x_1\}G_2\hat{}\{x_2\}$, $D = G_1\hat{}\{y_1\}G_2\hat{}\{y_2\}$ and $H = G_1^z$.

The member information is obtained by associating a member private key gsk[i], a revocation token grt[i] and signer tracing information $T_i$ with one another for each piece of user identifying information ID(i) ($1 \leq i \leq n$). Here, the revocation token grt[i] is the part $k_{i1}$ of the representation in the member private key gsk[i] of the member, and is information registered in the revocation list in a case where the member is revoked (invalidated). The revocation list (not shown) is a list of the revocation tokens grt[i] corresponding to the revoked members.

The user administrating information is obtained by associating the user information with each piece of the user identifying information ID(i). The user information includes, for example, a user's name, contact address information (a telephone number, an electronic mail address, etc.), and further includes settlement information in a case where the purpose of the group signature is an electronic business transaction.

The calculation table is information referred to in a case where the sections 14 to 16 use a simultaneous multiple exponentiation process. The simultaneous multiple exponentiation process is a method for executing calculation in the form of $G_1\hat{}\{e_1\}G_2\hat{}\{e_2\} \ldots G_k\hat{}\{e_k\}$ at a high speed, and multiplication needs to be beforehand executed $2^k$ times at maximum, thereby preparing the calculation table having a size of $2^k$ at maximum. Therefore, a memory size necessary for the calculation table increases in accordance with the number k of bases $G_1, \ldots, G_k$. However, when the base is fixed, the calculation table does not have to be prepared every time, and advance calculation can be performed with a calculation amount of about one exponentiation time. That is, even the calculation having an amount of two exponentiation times, for example, $G_1\hat{}\{e_1\}G_2\hat{}\{e_2\}$ can be executed with the calculation amount of one exponentiation time with reference to the calculation table. Therefore, when the group administrator and verifier apparatuses have '1', '$G_1$', '$G_2$', '$G_1 \times G_2$', 'F', '$F \times G_1$', '$F \times G_2$', '$F \times G_1 \times G_2$', '1', 'H', '$G_1$' and '$H \times G_1$' and the signer apparatus has '1', 'H', '$G_1$', '$H \times G_1$', '1', 'C', 'D' and '$C \times D$' in the calculation table, respectively, the calculation of two or three exponentiation times in steps ST4, ST5, ST34, ST36, ST42, ST44, ST52, ST54, ST62 or ST64 described later can be executed with the calculation amount of one exponentiation time.

The message msg is arbitrary information generated by the signer apparatus $20_i$.

The group signature σ is information constituted of a ciphertext ($U_1$, $U_2$, E, V, R) and a zero-knowledge proof (β, $s_1$, $s_2$, $s_r$) and prepared by the signer apparatus $20_i$.

The input section 12 is an input interface between the inside and the outside of the group administrator apparatus 10, and input devices such as a keyboard and a mouse are used.

The communicating section 13 is a communication interface between the inside and the outside of the group administrator apparatus 10. The communicating section 13 has, for example, a function of transmitting, to the signer apparatuses $20_1$ to $20_n$, the public parameter, group public key, member private key and signer tracing information $T_i$ for generating the group signature in the group signature system, by a secure technique such as encrypting communication. Moreover, the communicating section 13 has, for example, a function of transmitting, to the verifier apparatus 30, the public parameter, group public key and revocation list for verifying the group signature in the group signature system.

The group key generating section 14 generates the public parameter based on a security parameter to store the parameter in the storage section 11 for the group administrator, thereby generating, based on the public parameter, the group private key including the values a and $b \in Z_q^*$ and the group public key including the values $G_2$ and F and generator $G_1$ satisfying the first relational equation $G_2 = G_1^a$ and the second relational equation $F = G_1^b$. Here, the group key generating section 14 has a function of executing processing shown in FIG. 8. It is to be noted that the group key generating section 14 may execute the exponentiation by the simultaneous multiple exponentiation process with reference to the calculation table, and this also applies to the member private key generating section 15 and the signature verifying section 16.

The member private key generating section 15 calculates the member private key constituted of representation parts $k_{i1}$ and $k_{i2}$ satisfying a fourth relational equation $F = G_1\hat{}\{k_{i1}\}G_2\hat{}\{k_{i2}\}$ based on the group private key, the group public key and a third relational equation $k_{i1} = b - ak_{i2}$ mod q, and calculates the signer tracing information $T_i = G_1\hat{}\{k_{i1}\}$ based on the member private key and the generator $G_1$. Here, the member private key generating section 15 has a function of executing the processing shown in FIGS. 9 and 10. Moreover, grt[i] = $k_{i1}$.

The signature verifying section 16 verifies the correctness of the zero-knowledge proof in the group signature based on the group signature, the message, the public parameter and the group public key in the storage section 11 for the group administrator, and verifies the correctness of ciphertext data in the group signature based on the group signature, the group private key and the group public key in the storage section 11 for the group administrator. Here, the signature verifying section 16 has a function of executing the processing shown in FIG. 16, described later.

The signer tracing section 17 calculates the user ID=i based on the group signature and the group private key in the storage section 11 for the group administrator. Here, the signer tracing section 17 has a function of executing the processing shown in FIG. 17, described later.

The revocation list generating section 18 has a function of generating the revocation list including the part $k_{i1}$ of the representation of the revoked member. Specifically, the revocation list generating section 18 has a function of extracting, from the member information, the revocation token grt[i] corresponding to the user ID(i) in a set RU to enlist the tokens based on the set of the revocation tokens stored as a part of the member information in the storage section 11 for the group administrator and the set RU (not shown) of the user IDs indicating the revoked members stored beforehand in the storage section 11 for the group administrator, thereby generating the revocation list.

The output section 19 is an output interface between the inside and the outside of the group administrator apparatus 10, and an output device such as a display device or a printer is used.

As shown in FIG. 4, the signer apparatus $20_i$ comprises a storage section 21 for the signer, an input section 22, a communicating section 23, a message preparing section 24, a group signature generating section 25, a signer identity proving section 26 and an output section 27.

Figure 5:
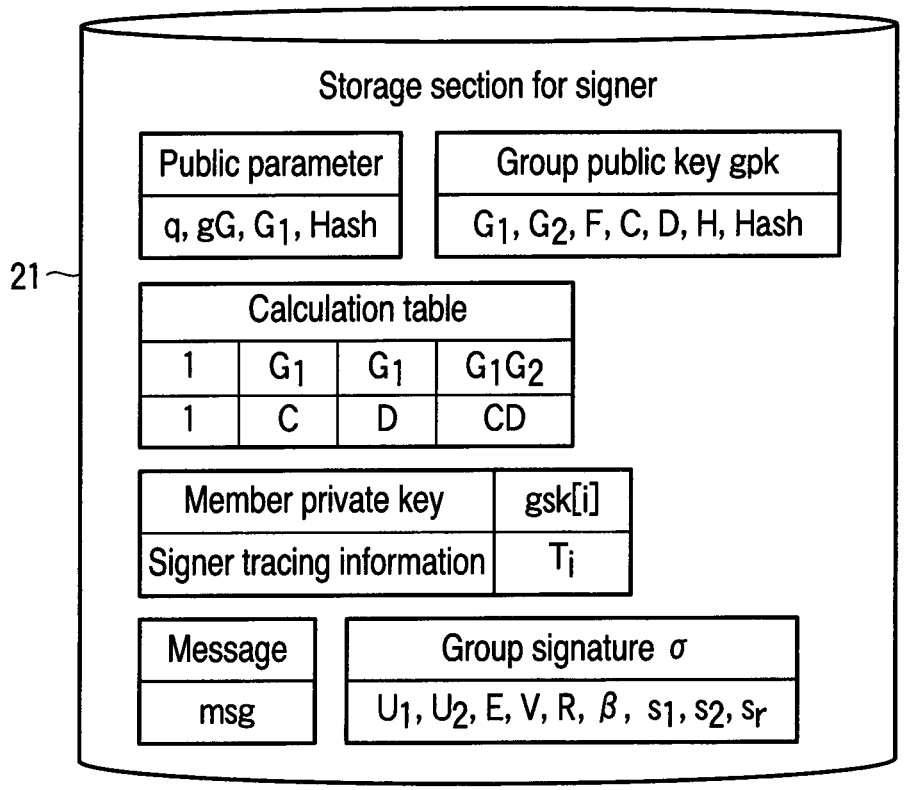
FIG. 5 is an exemplary diagram showing the constitution of a storage section for a signer in the embodiment.

The storage section 21 for the signer is a storage device accessible from the sections 22 to 26, and, as shown in FIG. 5, the public parameter, the group public key gpk, the calculation table, the member private key, the signer tracing information, the message and the group signature are stored.

The input section 22 is an input interface between the inside and the outside of the signer apparatus $20_i$, and input devices such as a keyboard and mouse are used.

The communicating section 23 is a communication interface between the inside and the outside of the signer apparatus $20_i$. The communicating section 23 has, for example, a function of receiving, from the group administrator apparatus 10, the public parameter, group public key, member private key and signer tracing information $T_i$ for generating the group signature in the group signature system, by a secure technique such as encrypted communication. Moreover, the communicating section 23 has, for example, a function of transmitting, to the verifier apparatus 30, the group signature constituted of the ciphertext data and zero-knowledge proof and the message in the storage section 21 for the signer, by the signer's operation of the input section 22.

The message preparing section 24 has a function of preparing the message msg to write the message in the storage section 21 for the signer by the signer's operation of the input section 22.

The group signature generating section 25 has a function of encrypting the signer tracing information $T_i$ based on the public parameter and group public key in the storage section 21 for the signer, and generating the ciphertext data of the signer tracing information $T_i$ to write the data in the storage section 21 for the signer. Moreover, the group signature generating section 25 has a function of generating the zero-knowledge proof indicating that the member private key and the signer tracing information $T_i$ are known, based on the public parameter, group public key, member private key and message in the storage section 21 for the signer and the ciphertext data of the signer tracing information $T_i$, and associating the zero-knowledge proof with the ciphertext data to write the proof in the storage section 21 for the signer. It is to be noted that the ciphertext data and the zero-knowledge proof constitute the group signature. Moreover, here, the group signature generating section 25 has a function of executing the processing shown in FIGS. 11 and 12. Moreover, the zero-knowledge proof shown in FIG. 12 is a proof based on the message msg indicating that the encrypted signer tracing information $T_i$ is known, one part of the representation is known and the signer tracing information $T_i$ is correctly encrypted. Moreover, the group signature generating section 25 may execute the exponentiation by the simultaneous multiple exponentiation process with reference to the calculation table.

The signer identity proving section 26 has a function of executing the signer identity proving process shown in FIG. 15.

The output section 27 is an output interface between the inside and the outside of the signer apparatus $20_i$, and output devices such as a display device and printer are used.

The verifier apparatus 30 includes, as shown in FIG. 6, a storage section 31 for the verifier, an input section 32, a communicating section 33, a signature verifying section 34, a signer identity verifying section 35, a signer information correctness proof verifying section 36 and an output section 37.

Figure 7:
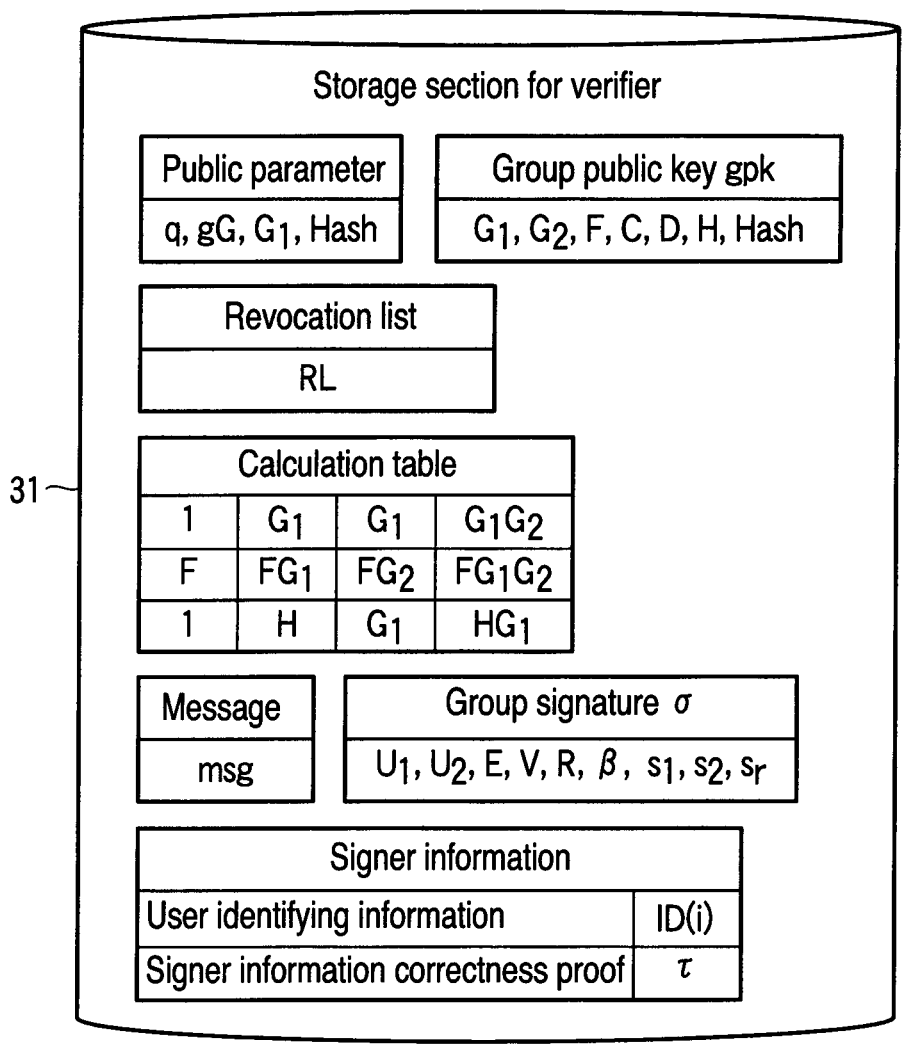
FIG. 7 is an exemplary diagram showing the constitution of a storage section for a verifier in the embodiment.

The storage section 31 for the signer is a storage device accessible from the sections 32 to 35, and, as shown in FIG. 7, the public parameter, the group public key gpk, the revocation list RL, the calculation table, the message and the group signature are stored.

The input section 32 is an input interface between the inside and the outside of the verifier apparatus 30, and input devices such as a keyboard and mouse are used.

The communicating section 33 is a communication interface between the inside and the outside of the verifier apparatus 30. The communicating section 33 has, for example, a function of receiving, from the group administrator apparatus 10, the public parameter, group public key and revocation list for generating the group signature in the group signature system, by a secure technique such as the encrypting communication. Moreover, the communicating section 33 has, for example, a function of receiving, from the signer apparatus $20_i$, the group signature constituted of the ciphertext data and zero-knowledge proof and the message, a function of writing the received group signature and message in the storage section 31 for the verifier, a function of transmitting the verification result of the signature verifying section 34 to the signer apparatus $20_i$, and a function of transmitting, to the group administrator apparatus 10, the message and group signature for tracing the signer if necessary.

The signature verifying section 34 verifies the correctness of the group signature based on the group signature, the message, the public parameter and the group public key in the storage section 31 for the verifier to transmit the verification result to the communicating section 33 and the output section 37. Here, the signature verifying section 34 has a function of executing the processing shown in FIGS. 13 and 14. Moreover, the signature verifying section 34 may execute the exponentiation by the simultaneous multiple exponentiation process with reference to the calculation table.

The signer identity verifying section 35 has a function of executing the signer identity verification processing shown in FIG. 15.

The output section 37 is an output interface between the inside and the outside of the verifier apparatus 30, and output devices such as a display device and printer are used. The output section 37 displays, for example, the verification result received from the signature verifying section 34.

The functions of the group administrator apparatus 10 can be divided by a member private key generator apparatus 101, a signer tracing apparatus 102 and a revocation administrator apparatus 103. The respective apparatuses and storage sections thereof are shown in FIGS. 22 and 23, FIGS. 24 and 25 and FIGS. 26 and 27. Each apparatus and each section have fewer processing sections and less information to be stored (especially, confidential information) as compared with the group administrator apparatus 10, and hence it can be seen that higher security and flexible can be realized as compared with a case where the group administrator apparatus processes all the functions. It is to be noted that a constitution in which the group administrator apparatus 10 is divided will specifically be described in a second embodiment.

Figure 29:
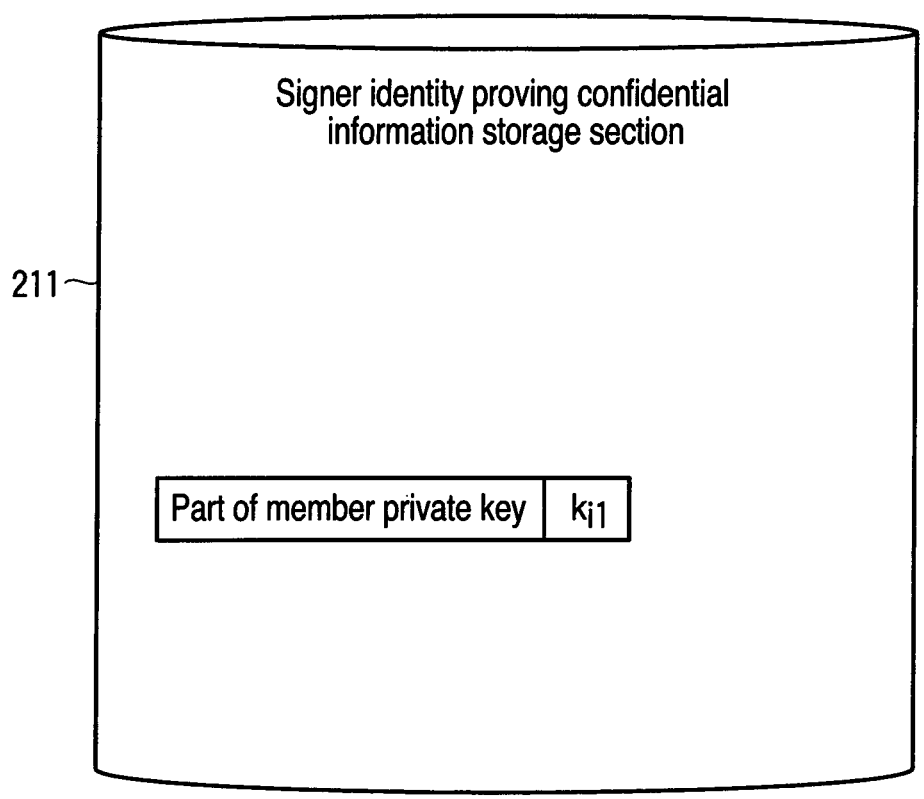
FIG. 29 is an exemplary diagram showing the constitution of a signer identity proving confidential information storage section in the embodiment.

The signer identity proving function only may be separated from the signer apparatus $20_i$ to obtain a signer identity proving function 201i. The apparatus and a storage section of the apparatus are shown in FIGS. 28 and 29. Also in this case, it can be seen that since the apparatus and section have less processing sections and less information to be stored (especially, confidential information), higher security and flexible operation can be realized as compared with the signer apparatus. It is to be noted that a constitution from which the signer identity proving function is separated will specifically be described in a third embodiment.

Next, the operation of the group signature system having the above constitution will be described with reference to flowcharts of FIGS. 8 to 20.

Figure 8:
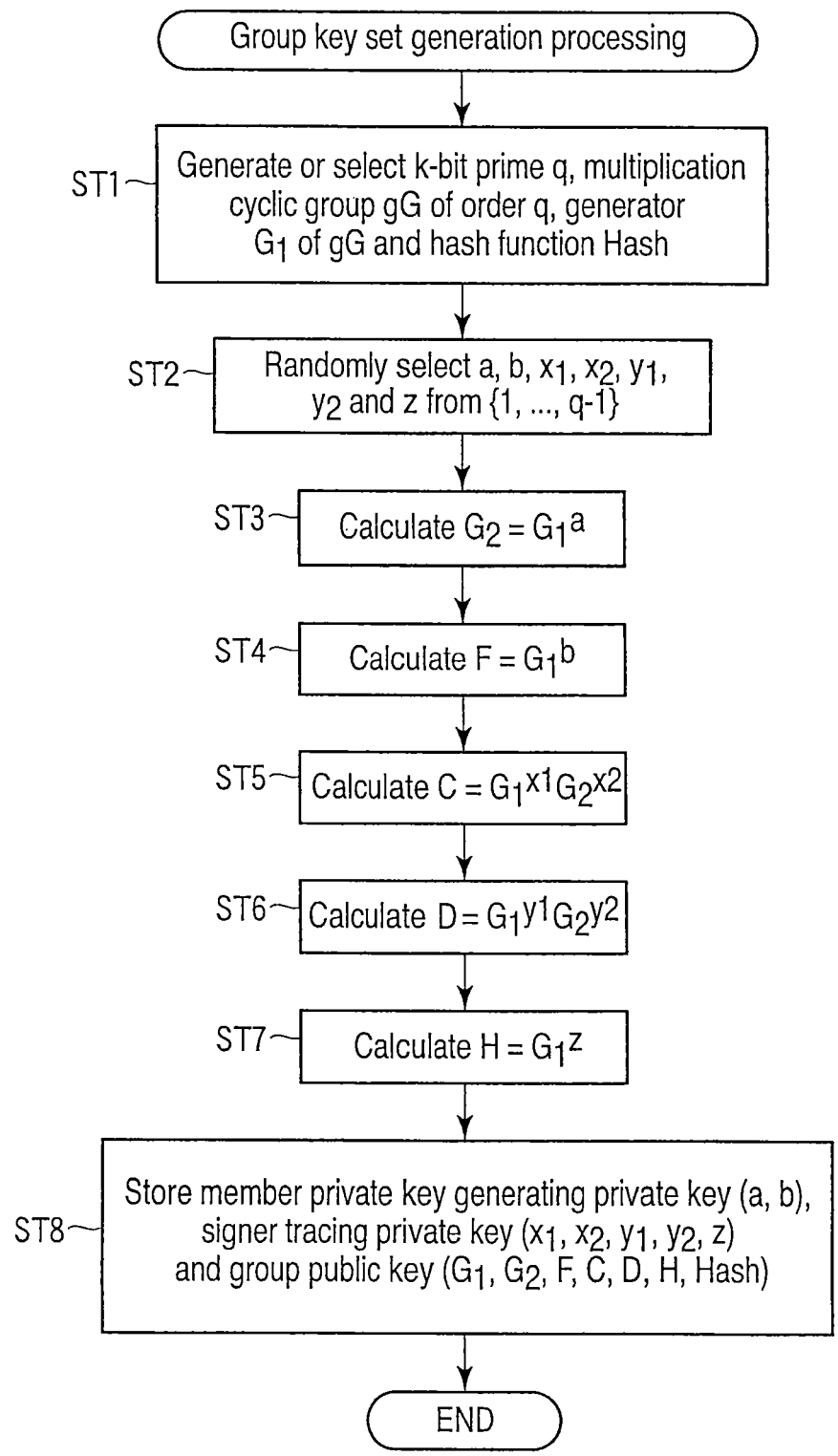
FIG. 8 is a flowchart for explaining the generation processing of a key pair in the embodiment.

(Group Key Set Generation: FIG. 8)

In the group administrator apparatus 10, the input section 12 is operated by the group administrator, whereby after inputting the security parameter k, the group key generating section 14 is started.

The group key generating section 14 generates or selects a prime q of k bits, a multiplication cyclic group gG of an order q, a generator $G_1$ of gG and a universal one-way hash function Hash, and stores (q, gG, $G_1$, Hash) as the public parameter in the storage section 11 for the group administrator (ST1).

The group key generating section 14 refers to the prime order q in the storage section 11 for the group administrator to randomly select septuplets (a, b, $x_1$, $x_2$, $y_1$, $y_2$, z)$\in Z_q^{*7}$ constituting the group private key gmsk (ST2). It is to be noted that $Z_q^*$ is a set $\{1, q-1\}$ of integers which are 1 or more and less than q. Moreover, a and b are values necessary for efficiently calculating a plurality of parts of a representation.

Subsequently, the group key generating section 14 calculates $G_2=G_1^a$, $F=G_1^b$, $C=G_1\hat{}\{x_1\}G_2\hat{}\{x_2\}$, $D=G_1\hat{}\{y_1\}G_2\hat{}\{y_2\}$ and $H=G_1^z$ based on the generator $G_1$ in the storage section 11 for the group administrator and the septuplets obtained in the step ST2 (ST3 to ST7). $G_1$ and $G_2$ are the bases of the representation of F.

Moreover, the group key generating section 14 reads the universal one-way hash function Hash from the public parameter in the storage section 11 for the group administrator.

Afterward, the group key generating section 14 stores the member private key generating private key ik=(a, b), the signer tracing private key ok=($x_1$, $x_2$, $y_1$, $y_2$, z) and the group public key gpk=($G_1$, $G_2$, F, C, D, H, Hash) in the storage section 11 for the group administrator (ST8). It is to be noted that the member private key generating private key ik and the signer tracing private key ok constitute the group private key gmsk.

In consequence, the group key generating section 14 transmits, to the output section 19, the message of the completion of the generation of the group public key gpk, the member private key generating private key ik and the signer tracing private key ok, thereby ending the processing. The output section 19 displays and outputs the generation completion message.

Figure 9:
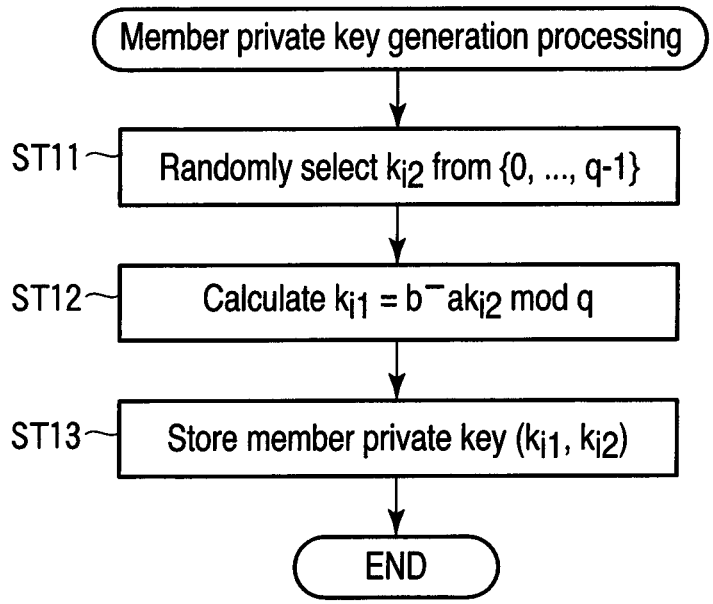
FIG. 9 is a flowchart for explaining the generation processing of a member private key in the embodiment.

(Member Private Key Generation: FIG. 9)

In the group administrator apparatus 10, the input section 12 is beforehand operated by the group administrator, whereby user identifying information pieces ID(1), . . . , ID(i), . . . , ID(j), . . . , and ID(n) of n users corresponding to the member number n are stored in the storage section 11 for the group administrator. It is to be noted that the user identifying information pieces ID(1), . . . , and ID(n) may be generated by the member private key generating section 15 into which the member number n has been input, and written from the member private key generating section 15 into the storage section 11 for the group administrator.

The member private key generating section 15 randomly selects a part $k_{i2} \in Z_q^*$ of the member private key with reference to the prime order q in the storage section 11 for the group administrator (ST11).

At this time, the member private key generating section 15 again selects $k_{i2}$ with reference to the storage section 11 for the group administrator in a case where there is present a member having a member private key $gsk_j=(k_{j1}, k_{j2})$, in which $k_{i2}=k_{j2}$. That is, $k_{i2}$ needs to differ with each of all the users.

Subsequently, the member private key generating section 15 calculates another part, $k_{i1}=b-ak_{i2}$ mod q, of the member private key based on the prime order q in the storage section 11 for the group administrator and the member private key generating private key ik(a, b) in the group private key gmsk (ST12).

Afterward, the member private key generating section 15 associates the member private key ($k_{i1}$, $k_{i2}$=gsk[i]) constituted of the obtained $k_{i1}$ and $k_{i2}$ with the user identifying information ID(i) to store the key in the storage section 11 for the group administrator (ST13).

Here, the member private key ($k_{i1}$, $k_{i2}$) is the representation of F in which ($G_1$, $G_2$) is a base. That is, $F=G_1\hat{}\{k_{i1}\}G_2\hat{}\{k_{i2}\}$ is represented based on the above equations $F=G_1^b$, $G_2=G_1^a$ and $k_{i1}=b-ak_{i2}$ mod q. Moreover, a plurality of member private keys can efficiently be calculated by using a and b included in the group private key gmsk. The representation parts $k_{i1}$ and $k_{i2}$ can be calculated only by the group administrator. When the representation parts $k_{i1}$ and $k_{i2}$ are known, this means that the group member is identified by the group administrator.

The member private key generating section 15 repeats the processing of the above steps ST11 to ST13 in accordance with the number n of times corresponding to the member number n, individually associates the member private keys gsk[1] to gsk[n] of the n members with the user identifying information pieces ID(1) to ID(n) to store the information in the storage section 11 for the group administrator, and then ends the processing.

Figure 10:
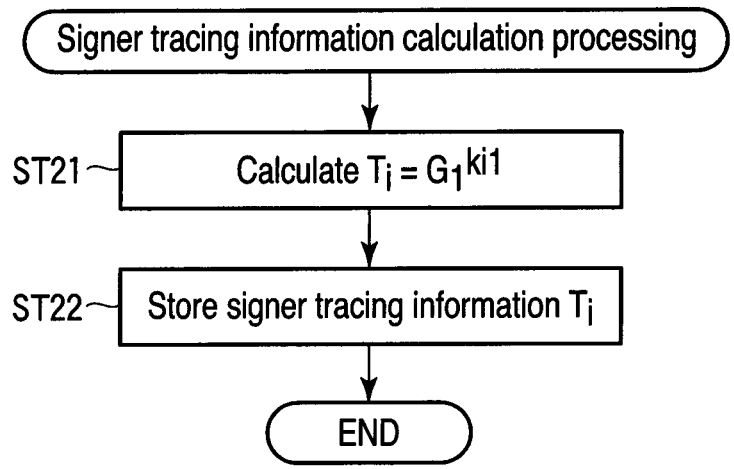
FIG. 10 is a flowchart for explaining the calculation processing of signer tracing information in the embodiment.

(Signer Tracing Information Calculation Processing: FIG. 10)

Next, the member private key generating section 15 calculates the signer tracing information $T_i=G_1\hat{}\{k_{i1}\}$ based on the generator $G_1$ and the member private key gsk[i] (=$k_{i1}$, $k_{i2}$) in the storage section 11 for the group administrator (ST21). That is, the signer tracing information $T_i$ is not the representation itself, but is a value obtained by using a part of the representation as an exponent.

Afterward, the member private key generating section 15 associates the obtained signer tracing information $T_i$ with the user identifying information ID(i) to store the information in the storage section 11 for the group administrator (ST22).

The member private key generating section 15 repeats the processing of the above steps ST21 and ST22 in accordance with the number n of the times corresponding to the member number n, individually associates the member private keys gsk[1] to gsk[n] of the n members with the user identifying information pieces ID(1) to ID(n) to store the information in the storage section 11 for the group administrator, and then ends the processing.

(Preparation for Signature Generation)

The user i registers the user information in the group administrator apparatus 10 on line or off line. In consequence, the user i acquires, from the group administrator, the public parameter, the group public key gpk=($G_1$, $G_2$, F, C, D, H, Hash), the member private key gsk[i] (=$k_{i1}$, $k_{i2}$) and the signer tracing information $T_i$ by a secure technique such as encrypted communication or the sending of a storage medium by mail.

Afterward, in the signer apparatus $20_i$, the user i operates the input section 22, whereby the public parameter, the group public key gpk, the member private key gsk[i] and the signer tracing information $T_i$ are stored in the storage section 21 for the signer. In consequence, the signer apparatus $20_i$ enables signature generation processing.

Moreover, in the signer apparatus $20_i$, the user i operates the input section 22, whereby the message preparing section 24 prepares a message msg$\in\{0, 1\}$* while displaying the message, and the obtained message msg is stored in the storage section 21 for the signer. It is to be noted that the message msg to be used is not limited to the message prepared by the message preparing section 24, but a message acquired from the group administrator or the signature verifier may be used. For example, in the case of an electronic business transaction, the message msg prepared by the message preparing section 24 may be used, in the case of the qualification of a user above the age of 20, the message msg acquired from the group administrator may be used, and in the case of authentication, the message msg acquired from the signature verifier may be used.

Figure 11:
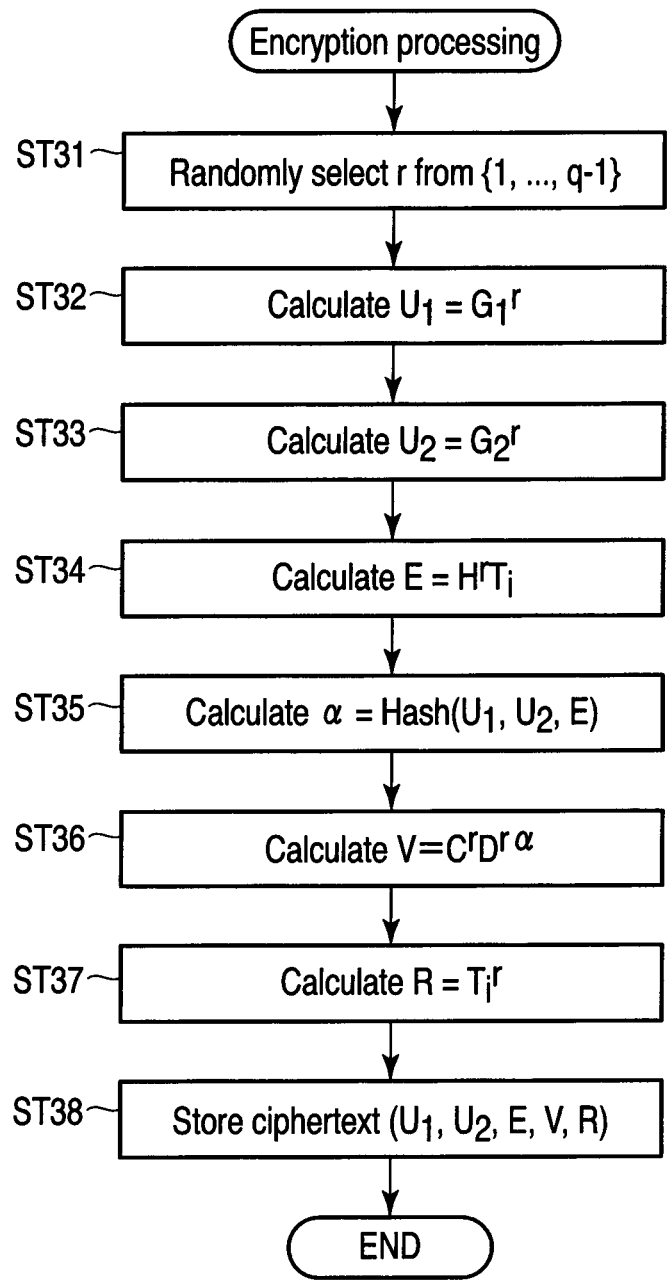
FIG. 11 is a flowchart for explaining encryption processing in the embodiment.

(Encryption Processing: FIG. 11)

In the signer apparatus $20_i$, when the user i operates the input section 22, the group signature generating section 25 is started.

The group signature generating section 25 randomly selects a private random number $r \in Z_q^*$ with reference to the prime order q in the storage section 21 for the signer (ST31).

Subsequently, the group signature generating section 25 calculates $U_1 = G_1^r$, $U_2 = G_2^r$ and $E = H^r T_i$ based on the group public key gpk=($G_1$, $G_2$, F, C, D, H, Hash) and the signer tracing information $T_i$ in the storage section 21 for the signer and the random number r obtained in the step ST31 (ST32 to ST34). It is to be noted that the signer tracing information $T_i$ ($=G_1\char`^\{k_{i1}\}$) may be calculated from the member private key gmsk[i] ($=k_{i1}$, $k_{i2}$) every time. In this case, the signer tracing information $T_i$ may be omitted from the storage section 21 for the signer.

Moreover, the group signature generating section 25 calculates a hash value $\alpha$=Hash ($U_1$, $U_2$, E) based on the group public key gpk in the storage section 21 for the signer and the values $U_1$, $U_2$ and E obtained in the step ST32 to ST34 (ST35).

Furthermore, the group signature generating section 25 calculates a value $V=C'D'^\alpha$ based on this hash value $\alpha$, the random number r obtained in the step ST31 and the group public key gpk (ST36).

In addition, the group signature generating section 25 calculates $R=T_i^r$ (ST37).

Consequently, the group signature generating section 25 stores the ciphertext ($U_1$, $U_2$, E, V, R) obtained with respect to the signer tracing information $T_i$ in the storage section 21 for the signer (ST38).

(Zero-Knowledge Proof Calculation Processing: FIG. 12)

Next, the group signature generating section 25 randomly selects random numbers $r_1$, $r_2$, $r_r \in Z_q^*$ for hiding the member private key ($k_{i1}$, $k_{i2}$) and the random number r obtained in the step ST31 with reference to the prime order q in the storage section 21 for the signer (ST41).

Subsequently, the group signature generating section 25 calculates parameters $R_1=G_1\char`^\{r_1\}G_2\char`^\{r_2\}$, $R_2=G_1\char`^\{r_r\}$, $R_3=H\char`^\{r_r\}G_1\char`^\{r_r\}$ and $R_4=U_1\char`^\{r_1\}$ as a part of the zero-knowledge proof based on the group public key gpk=($G_1$, $G_2$, F, C, D, H, Hash) in the storage section 21 for the signer and the random numbers $r_1$, $r_2$ and $r_r$ obtained in the step ST41 (ST42 to ST45).

Moreover, the group signature generating section 25 calculates a hash value $\beta$=Hash($G_1$, $G_2$, H, $U_1$, $U_2$, E, V, R, $R_1$, $R_2$, $R_3$, $R_4$,msg) based on the group public key gpk=($G_1$, $G_2$, F, C, D, H, Hash), the ciphertext ($U_1$, $U_2$, E, V, R) and the message msg in the storage section 21 for the signer and the parameters $R_1$, $R_2$, $R_3$ and $R_4$ as a part of the zero-knowledge proof obtained in the steps ST42 to ST45 (ST46).

Furthermore, the group signature generating section 25 calculates parameters $s_1=r_1+\beta k_{i1}$ mod q, $s_2=r_2+\beta k_{i2}$ mod q and $s_r=r_r+\beta r$ mod q as a part of another zero-knowledge proof based on this hash value $\beta$, the random numbers $r_1$, $r_2$ and $r_r$ obtained in the step ST41, and the member private keys $k_{i1}$ and $k_{i2}$ and prime order q in the storage section 21 for the signer (ST47 to ST49).

In consequence, the group signature generating section 25 associates the finally obtained zero-knowledge proof ($\beta$, $s_1$, $s_2$, $s_r$) with the ciphertext ($U_1$, $U_2$, E, V, R) to store the proof in the storage section 21 for the signer (ST50), thereby ending the processing. Hereinafter, the ciphertext ($U_1$, $U_2$, E, V, R) and the zero-knowledge proof ($\beta$, $s_1$, $s_2$, $s_r$) as the group signature $\sigma=(U_1, U_2, E, V, R, \beta, s_1, s_2, s_r)$.

The group signature $\sigma$ is constituted of the ciphertext ($U_1$, $U_2$, E, V, R) of the signer tracing information $T_i$ and the zero-knowledge proof ($\beta$, $s_1$, $s_2$, $s_r$) indicating that the user is a correct user who knows the representation parts $k_{i1}$ and $k_{i2}$ of F in which $G_1$ and $G_2$ are bases and that the corresponding signer tracing information $T_i$ is correctly encrypted.

Afterward, in the signer apparatus $20_i$, the signer operates the input section 22, whereby the group signature $\sigma$ and message msg in the storage section 21 for the signer are displayed in the output section 27, and transmitted from the communicating section 23 to the verifier apparatus 30. In consequence, the member private keys $k_{i1}$ and $k_{i2}$ are not displayed, but it can be proved that the member is a correct member who belongs to the group and the group administrator can trace the signer.

Figure 13:
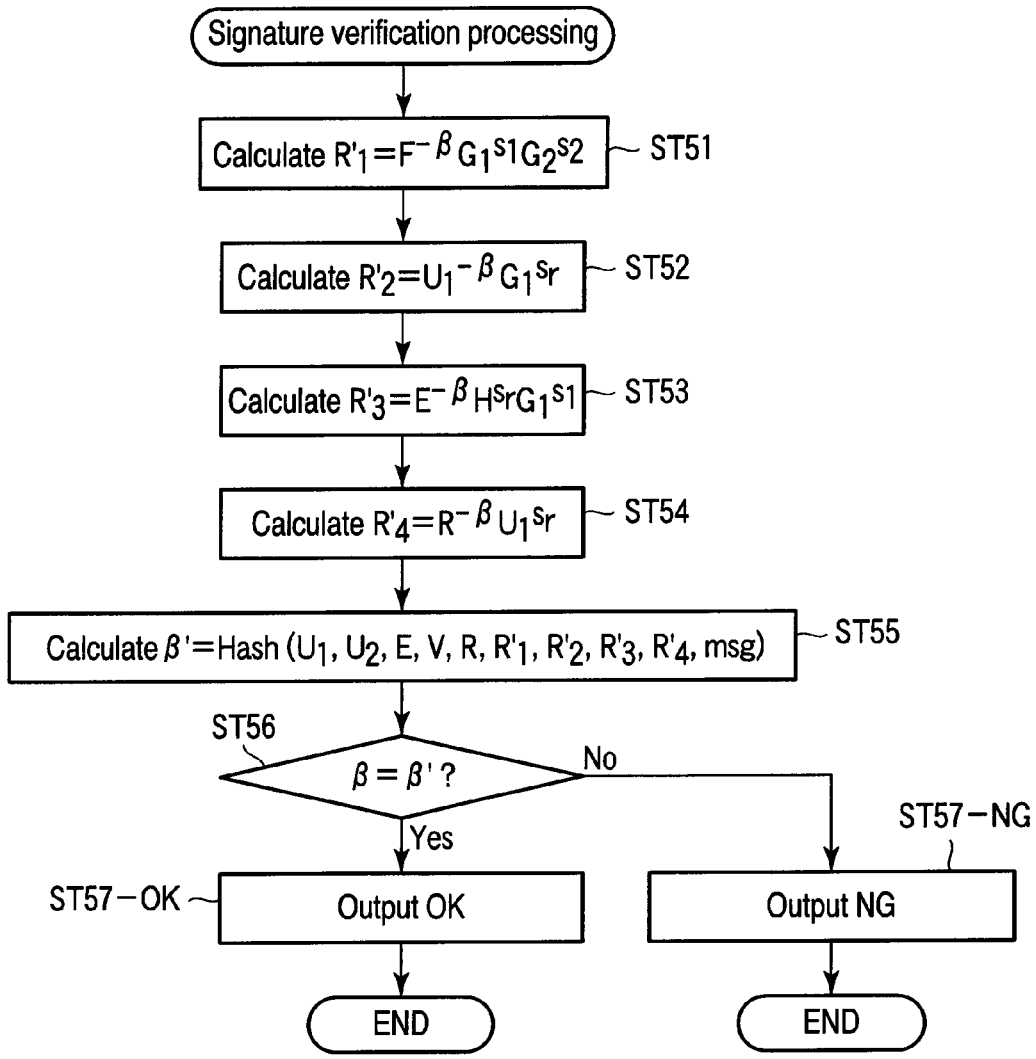
FIG. 13 is a flowchart for explaining signature verification processing in the embodiment.

(Signature Verification Processing: FIG. 13)

In the verifier apparatus 30, the verifier beforehand operates the input section 32, whereby the public parameter (q, gG, $G_1$, Hash) and the group public key gpk=($G_1$, $G_2$, F, C, D, H, Hash) are acquired from the group administrator apparatus 10 and stored in the storage section 31 for the verifier. In consequence, the verifier apparatus 30 enables the signature verification processing.

In the verifier apparatus 30, the message msg, the group signature $\sigma=(U_1, U_2, E, V, R, \beta, s_1, s_2, s_r)$ and a verification request transmitted from the signer apparatus $20_i$ are received by the communicating section 33 and stored in the storage section 31 for the verifier, and this verification request is transmitted to the signature verifying section 34 by the communicating section 33.

Upon receiving the verification request, the signature verifying section 34 calculates $R'_1=F\char`^\{-\beta\}G_1\char`^\{s_1\}G_2\char`^\{s_2\}$, $R'_2=U_1\char`^\{-\beta\}G_1\char`^\{s_r\}$, $R'_3=E\char`^\{-\beta\}H\char`^\{s_r\}G_1\char`^\{s_1\}$ and $R'_4=R\char`^\{-\beta\}U_1\char`^\{s_r\}$ based on the group public key gpk and the group signature $\sigma$ in the storage section 31 for the verifier (ST51 to ST54).

Subsequently, the signature verifying section 34 calculates Hash value $\beta'$=Hash($G_1$, $G_2$, H, $U_1$, $U_2$, E, V, R, $R'_1$, $R'_2$, $R'_3$, $R'_4$, msg) based on the group public key gpk, the message msg, the group signature $\sigma$ and the above $R'_1$, $R'_2$, $R'_3$ and $R'_4$ (ST55). It is to be noted that the signature verifying section 34 may confirm the range of the values of the group signature $\sigma$ based on a predetermined reference range.

As a result of the step ST55, when the verifying equation $\beta=\beta'$ is established, it is judged that the signature is valid, thereby outputting the judgment result OK to the communicating section 33 and the output section 37 (ST57—OK). When the verifying equation is not established, it is judged that the signature is invalid, thereby outputting the judgment result NG to the communicating section 33 and the output section 37 (ST57—NG).

The communicating section 33 transmits the judgment result OK/NG to the signer apparatus $20_i$, thereby ending the processing. The output section 37 displays and outputs the judgment result OK/NG.

(Revoke Verification Processing: FIG. 14)

In the verifier apparatus 30, the verifier beforehand operates the input section 32, whereby the public parameter (q, gG, $G_1$, Hash), the group public key gpk=($G_1$, $G_2$, F, C, D, H, Hash) and the revocation list RL are acquired from the group administrator apparatus 10 and stored in the storage section 31 for the verifier. In consequence, the verifier apparatus 30 enables the revoke verification processing.

The signature verifying section 34 confirms whether or not all grt ($=k_1$) included in the revocation list RL have been checked (ST61). When checked, it is judged that the signature is valid, thereby outputting the judgment result OK to the communicating section 33 and the output section 37 (ST64—OK). If not, the processing is continued.

Subsequently, the signature verifying section 34 selects non-checked grt ($=k_1$) included in the revocation list RL (ST62) to confirm whether or not $R=U_1\hat{}\{k_1\}$ (ST63). If the equal sign of the above equation is established, it is judged that the signature is invalid, thereby outputting the judgment result NG to the communicating section 33 and the output section 37 (ST64—NG). If not, the processing returns to the check of the next grt (ST61).

(Signer Identity Proving/Verification Processing: FIG. 15)

In the signer apparatus $20_i$, the signer beforehand operates the input section 22, whereby the public parameter (q, gG, $G_1$, Hash), the group public key gpk=($G_1$, $G_2$, F, C, D, H, Hash), the member private key gsk[i] and the signer tracing information $T_i$ are acquired from the group administrator apparatus 10 and stored in the storage section 21 for the signer. Moreover, the group signature $\sigma=(U_1, U_2, E, V, R, \beta, s_1, s_2, s_r)$ as a target subjected to the signer identity verification is also stored in the storage section 21 for the signer. In consequence, the signer apparatus $20_i$ enables the signer identity proving process.

In the verifier apparatus 30, the verifier beforehand operates the input section 32, whereby the public parameter (q, gG, $G_1$, Hash) and the group public key gpk=($G_1$, $G_2$, F, C, D, H, Hash) are acquired from the group administrator apparatus 10 and stored in the storage section 31 for the verifier. Moreover, the group signature $\sigma=(U_1, U_2, E, V, R, \beta, s_1, s_2, s_r)$ as the target subjected to the signer identity verification is acquired on-line or off-line and stored in the storage section 31 for the verifier. In consequence, the verifier apparatus 30 enables the signer identity verification processing.

The data communication between the signer apparatus and the verifier apparatus is performed through the communicating section 23 of the signer apparatus and the communicating section 33 of the verifier apparatus, respectively.

In the signer apparatus $20_i$, when the user i operates the input section 22, the signer identity proving section 26 is started.

The signer identity proving section 26 randomly selects a random number $r_1 \in Z_q^*$ for hiding the member private key ($k_{i1}$) with reference to the prime order q in the storage section 21 for the signer (ST71).

Subsequently, the signer identity proving section 26 calculates a parameter $R'=U_1\hat{}\{r_1\}$ as commitment to the zero-knowledge proof based on the group signature $\sigma=(U_1, U_2, E, V, R, \beta, s_1, s_2, s_r)$ in the storage section 21 for the signer and the random number r obtained in the step ST71 (ST72), thereby transmitting the parameter to the verifier apparatus 30.

The verifier apparatus 30 transmits the received commitment R' to the signer identity verifying section 35 to start the signer identity verification processing.

The signer identity verifying section 35 selects a random number $\delta \in Z_q^*$ as the challenge of the zero-knowledge proof (ST73), thereby transmitting the number to the signer apparatus $20_i$.

The signer identity proving section 26 calculates a parameter $s'1=r1+\delta k_{i1}$ mod q as a response to the zero-knowledge proof based on the challenge $\delta$ received from the verifier apparatus 30, the random number $r_1$ obtained in the step ST71 and the part $k_{i1}$ and the prime order q stored in the storage section 21 for the signer (ST74), thereby transmitting the parameter to the verifier apparatus 30.

The signer identity verifying section 35 verifies whether or not $R'=R\hat{}\{-\delta\}U_1\hat{}\{s'_1\}$ is established, based on the group signature $\sigma$ in the storage section 31 for the verifier, the commitment R' received in the step ST73, the challenge $\delta$ prepared in the step ST73 and the received $s'_i$ (ST75).

As the result of the step ST75, when the verifying equation $R'=R\hat{}\{-\delta\}U_1\hat{}\{s'_1\}$ is established, it is judged that the signer is true, to output the judgment result OK to the communicating section 33 and the output section 37, thereby ending the processing (ST76—OK). When the verifying equation is not established, it is judged that the signer is false, to output the judgment result NG to the communicating section 33 and the output section 37, thereby ending the processing (ST76—NG).

Figure 16:
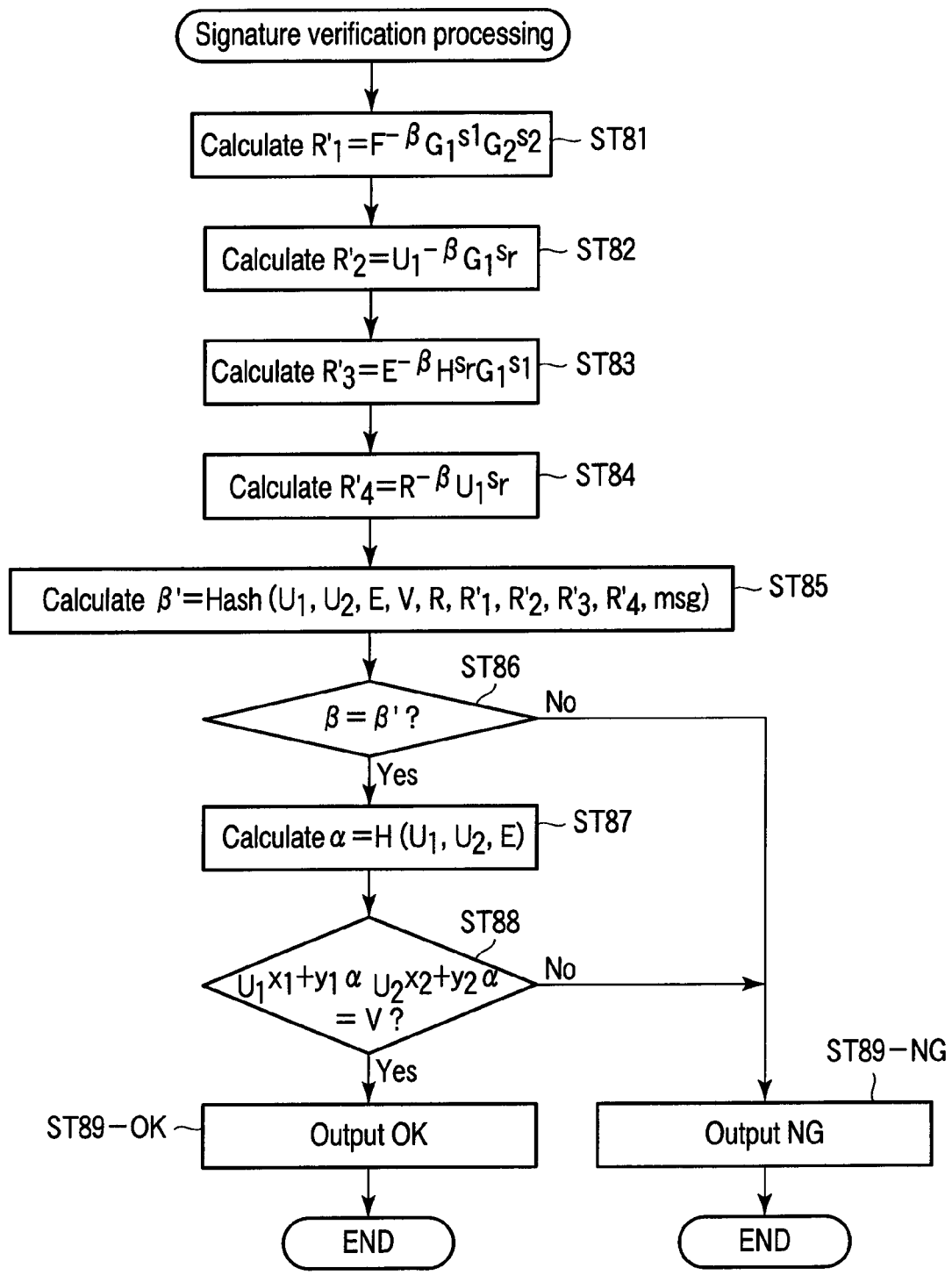
FIG. 16 is a flowchart for explaining the signer verification processing in the embodiment.
Figure 17:
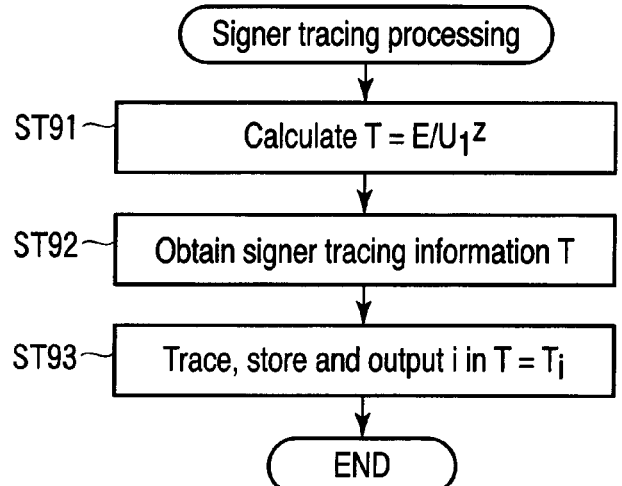
FIG. 17 is a flowchart for explaining signer tracing processing in the embodiment.

(Signer Verification Processing and Signer Tracing Processing: FIGS. 16 and 17)

There will be described a case where a necessity to trace the signer occurs owing to a situation such as the revelation of injustice or the collection of a service utilization fee.

In the group administrator apparatus 10, the message msg, group signature $\sigma$ and signer tracing request transmitted from the verifier apparatus 30 are received by the communicating section 13 and stored in the storage section 11 for the group administrator, and this signer tracing request is transmitted from the communicating section 13 to the signature verifying section 16.

On receiving the signer tracing request, as shown in FIG. 16, the signature verifying section 16 calculates $R'_1=F\hat{}\{-\beta\}G_1\hat{}\{s_1\}G_2\hat{}\{s_2\}$, $R'_2=U_1\hat{}\{-\beta\}G_1\hat{}\{s_r\}$, $R'_3=E\hat{}\{-\beta\}H\hat{}\{s_r\}G_1\hat{}\{s_1\}$ and $R'_4=R\hat{}\{-\beta\}U_1\hat{}\{s_r\}$ based on the group public key gpk, the message msg and the group signature $\sigma$ in the storage section 11 for the group administrator (ST81 to ST84).

Subsequently, the signature verifying section 16 calculates a hash value $\beta=H(G_1, G_2, H, U_1, U_2, E, V, R, R'_1, R'_2, R'_3, R'_4,$ msg) based on the group public key gpk, the message msg and the group signature $\sigma$ in the storage section 11 for the group administrator and the above $R'_1, R'_2, R'_3$ and $R'_4$ (ST85) It is to be noted that the signature verifying section 16 may confirm the range of the value of the group signature a based on a predetermined reference range.

As the result of the step ST85, when the verifying equation $\beta=\beta'$ is not established, it is judged that the signature is invalid, to output NG to the communicating section 13

(ST89—NG). The communicating section 13 transmits the judgment result NG to the verifier apparatus 30, thereby ending the processing.

On the other hand, as the result of the step ST85, when the verifying equation $\beta=\beta'$ is established, it is judged that the signature is valid, and the signature verifying section 16 calculates a hash value $\alpha=H(U_1, U_2, E)$ based on the group public key gpk and the group signature $\sigma$ (ST87).

Afterward, the signature verifying section 16 verifies whether or not a verifying equation $U_1\hat{~}\{x_1+y_1\alpha\}U_2\hat{~}\{x_2+y_2\alpha\}=V$ is established, based on the group signature $\sigma=(U_1, U_2, E, V, R, \beta, s_1, s_2, s_r)$, the signer tracing private key $ok=(x_1, x_2, y_1, y_2, z)$ and the hash value $\alpha$ in the storage section 11 for the group administrator (ST88). When the equation is not established, it is judged that the signature is invalid, to transmit NG to the communicating section 13 (ST89—NG). The communicating section 13 transmits the judgment result NG to the verifier apparatus 30, thereby ending the processing.

On the other hand, as the result of the step ST88, when the verifying equation is established, it is judged that the signature is valid, and the signature verifying section 16 transmits the judgment result OK and the signer tracing request to the signer tracing section 17, thereby ending the processing (ST89—OK). On receiving the judgment result OK and the signer tracing request, as shown in FIG. 15, the signer tracing section 17 calculates signer tracing information $T=E/U_1^z$ based on the group signature a and the signer tracing private key ok in the storage section 11 for the group administrator (ST91), to obtain the signer tracing information T (ST92).

Subsequently, the signer tracing section 17 searches the storage section 11 for the group administrator based on the signer tracing information T, and specifies user identifying information ID( ) corresponding to the signer tracing information T to store the information as a part of the signer information in the storage section 11 for the group administrator. Moreover, the section outputs the information to the output section 19 (ST93), to perform signer information correctness proof generation processing shown in FIG. 18. Furthermore, the signer tracing section 17 may search the storage section 11 for the group administrator based on the user identifying information ID( ) and output the user information corresponding to the user identifying information ID( ) to the output section 19.

The output section 19 displays and outputs the user identifying information ID( ) and the user information.

Figure 18:
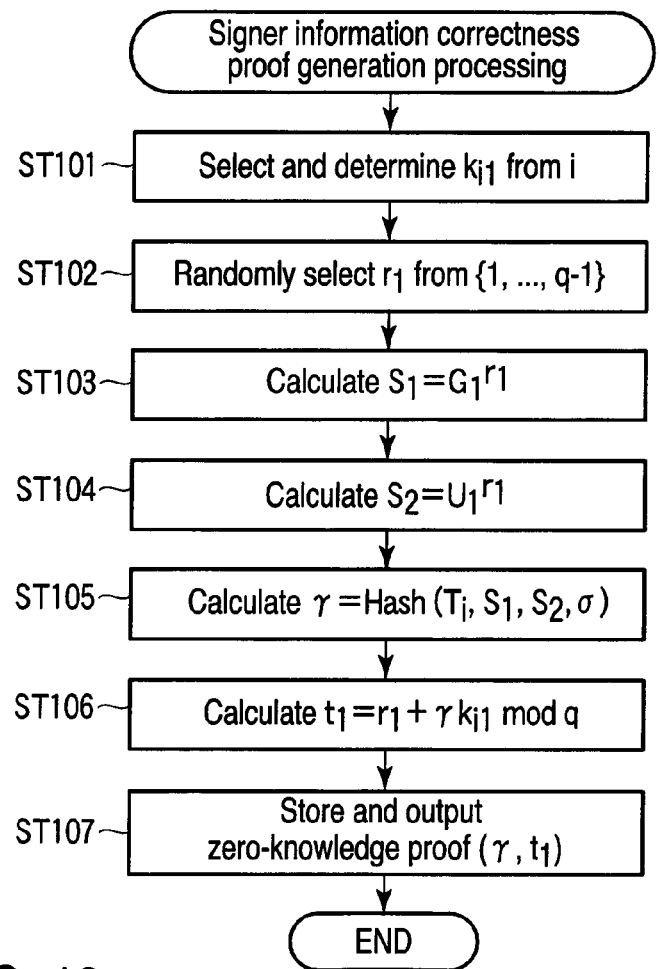
FIG. 18 is a flowchart for explaining signer information correctness proof generation processing in the embodiment.

(Signer Information Correctness Proof Generation Processing: FIG. 18)

The signer tracing section 17 selects and determines the part $k_{i1}$ of the representation corresponding to the input user identifying information ID=i (ST101).

Next, the signer tracing section 17 randomly selects the random number $r_t \in Z_q^*$ for hiding the member private key ($k_{i1}$) with reference to the prime order q in the storage section 11 for the group administrator (ST102).

Subsequently, the signer tracing section 17 calculates parameters $S_1=G_1\hat{~}\{r_1\}$ and $S_2=U_1\hat{~}\{r_1\}$ as a part of the zero-knowledge proof based on the group public key gpk=$(G_1, G_2, F, C, D, H, Hash)$ and the group signature $\sigma=(U_1, U_2, E, V, R, \beta, s_1, s_2, s_r)$ in the storage section 11 for the group administrator and the random number r1 obtained in the step ST102 (ST103 and ST104).

Moreover, the signer tracing section 17 calculates a hash value $\gamma=\text{Hash}(T_i, S_1, S_2, \sigma)$ based on the group public key gpk=$(G_1, G_2, F, C, D, H, \text{Hash})$ and the signer tracing information $T_i$ in the storage section 11 for the group administrator, the parameters $S_1$ and $S_2$ obtained as a part of the zero-knowledge proof in the steps ST103 and ST104 and the group signature $\sigma$ (ST105).

Furthermore, the signer tracing section 17 calculates a parameter $t_1=r_1+\gamma k_{i1}$ mod q as a part of another zero-knowledge proof based on this hash value $\gamma$, the random number $r_1$ obtained in the step ST102, the part $k_{i1}$ of the representation obtained in the step ST101 and the prime order q (ST106).

In consequence, the signer tracing section 17 stores the finally obtained zero-knowledge proof $\tau=(\gamma, t_1)$ as a part of the signer information in the storage section 11 for the group administrator, and outputs the proof to the output section 19 (ST107), thereby ending the processing.

This zero-knowledge proof $\tau$ indicates that the ciphertext $(U_1, U_2, E, V, R)$ included in the group signature $\sigma$ is the correct ciphertext of the signer tracing information $T_i$.

Afterward, in the group administrator apparatus 10, if necessary, the group administrator operates the input section 12, whereby the group signature $\sigma$, the user's ID=i specified from the signature and the signer information correctness proof $\tau$ are read from the storage section 11 for the group administrator, displayed in the output section 19 and transmitted from the communicating section 13 to the verifier apparatus 30. In consequence, the part $k_{i1}$ of the representation is not displayed, but it can be proved that the signer tracing has correctly been performed.

Figure 19:
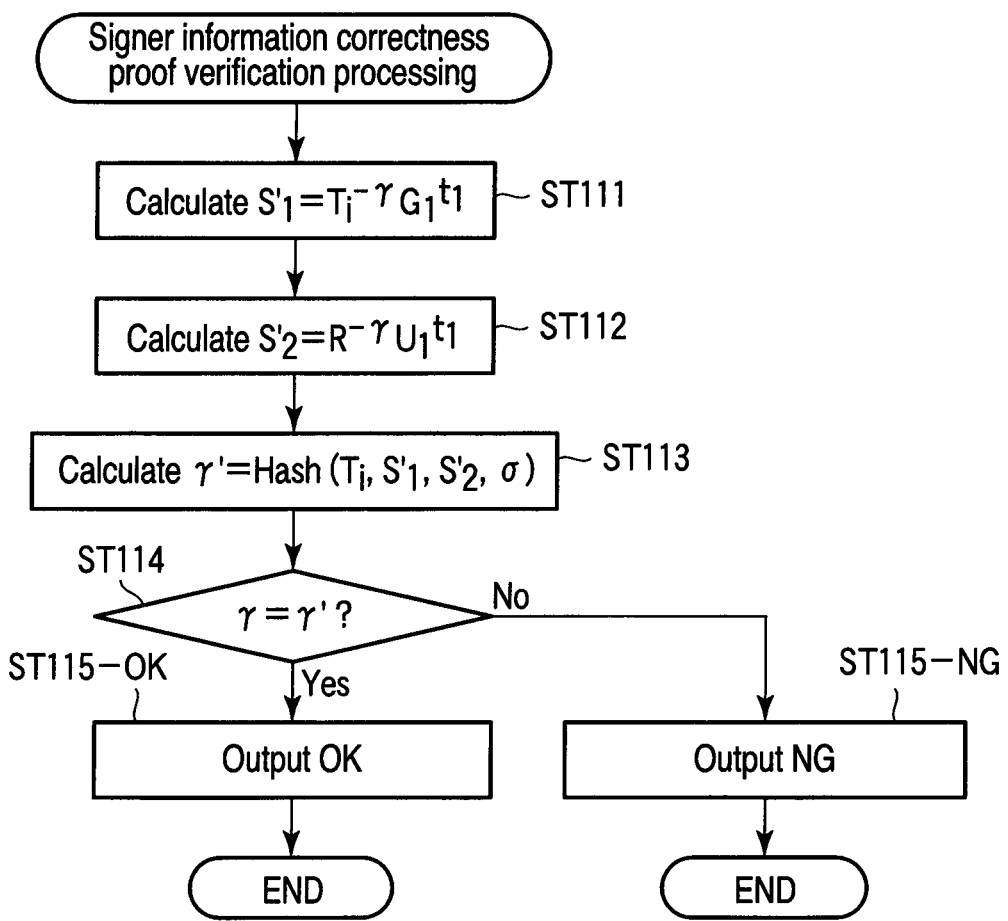
FIG. 19 is a flowchart for explaining signer information correctness proof verification processing in the embodiment.

(Signer Information Correctness Proof Verification Processing: FIG. 19)

In the verifier apparatus 30, the verifier beforehand operates the input section 32, whereby the public parameter (q, gG, $G_1$, Hash) and the group public key gpk=$(G_1, G_2, F, C, D, H, \text{Hash})$ are acquired from the group administrator apparatus 10 and stored in the storage section 31 for the verifier. In consequence, the verifier apparatus 30 enables signature verification processing.

In the verifier apparatus 30, the group signature a transmitted from the group administrator apparatus 10, the user's ID=i specified from the signature, the signer tracing information $T_i$ corresponding to the ID, the signer information correctness proof $\tau$ and the verification request are received by the communicating section 33 and stored in the storage section 31 for the verifier. Moreover, this verification request is transmitted from the communicating section 33 to the signer information correctness proof verifying section 36.

The signer information correctness proof verifying section 36 calculates $S'_1=T_i\hat{~}\{-\gamma\}G_1\hat{~}\{t_i\}$ and $S'_2=R\hat{~}\{-\gamma\}U_1\hat{~}\{t_i\}$ based on the group public key gpk, the group signature $\sigma$, the signer information correctness proof $\tau$ and the signer tracing information $T_i$ in the storage section 31 for the verifier (ST111 and ST112).

Subsequently, the signature verifying section 34 calculates a hash value $\gamma'=\text{Hash}(T_i, S'_1, S'_2, \sigma)$ based on the group public key gpk, the group signature $\sigma$, the signer tracing information $T_i$ and the above $S'_1$ and $S'_2$ (ST113). It is to be noted that the signer information correctness proof verifying section 36 may confirm the range of the value of the signer information correctness proof $\tau$ based on a predetermined reference range.

As the result of the step ST113, when the verifying equation $\gamma=\gamma'$ is established, it is judged that the proof is valid, to output the judgment result OK to the communicating section 33 and the output section 37 (ST115—OK). When the verifying equation is not established, it is judged that the proof is invalid, to output the judgment result NG to the communicating section 33 and the output section 37 (ST115—NG).

The communicating section 33 transmits the judgment result OK/NG to the group administrator apparatus 10, thereby ending the processing. The output section 37 displays and outputs the judgment result OK/NG.

Figures 20, 21:
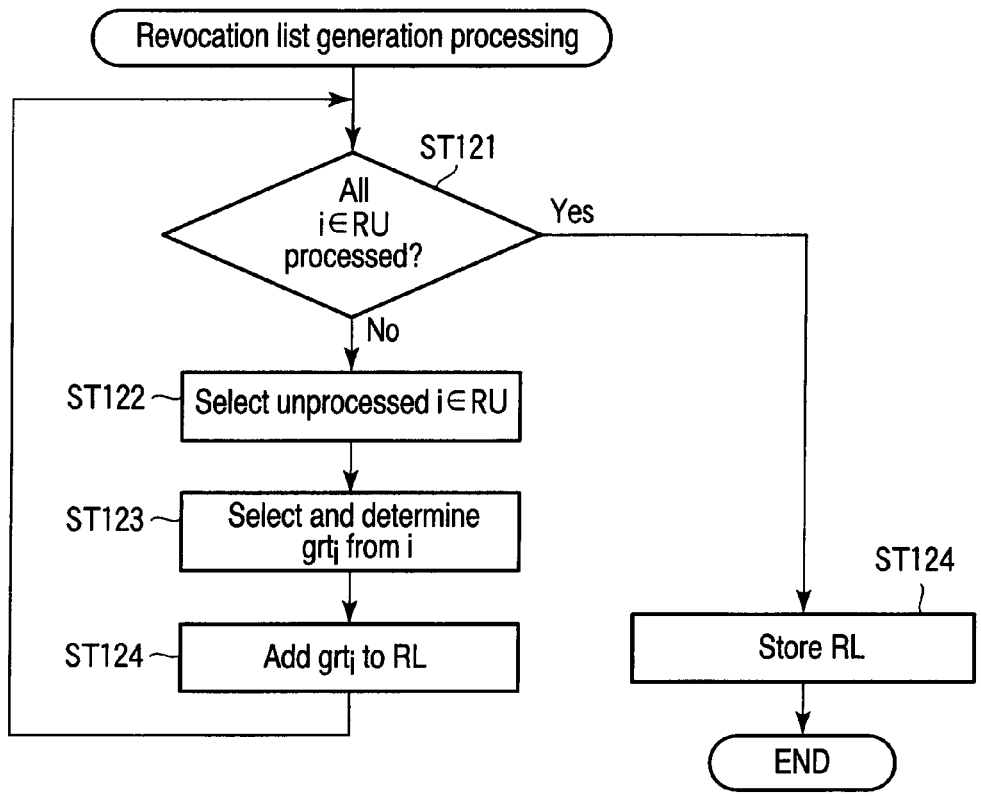
FIG. 20 is a flowchart for explaining revocation list generation processing in the embodiment.
FIG. 21 is a diagram showing the effect of the embodiment in comparison with a conventional technology.

(Revocation List Generation Processing: FIG. 20)

In the group administrator apparatus 10, the verifier beforehand operates the input section 12, whereby the set RU of the IDs of the revoked users is input and written in the storage section 11 for the group administrator. In consequence, the group administrator apparatus 10 enables revocation list generation processing.

The revocation list generating section 18 confirms whether or not the revocation list RL has been generated with respect to all the IDs included in the set RU of the IDs of the revoked users (ST121). When the list has been processed, the revocation list RL of the processing result is stored in the storage section 11 for the group administrator (ST124). If not, the processing is continued.

Subsequently, the revocation list generating section 18 selects unprocessed ID=i included in the set RU of the IDs of the revoked users (ST122), selects and determines the revocation token grt[i] corresponding to the selected user ID(i) from the member information (ST123), adds this grt[i] to the revocation list RL (ST124), and returns to the step ST121 to confirm the next user ID(i).

<Security of Embodiment System>

Here, the security of the embodiment system will be described.

[Theorem 1] The suggested group signature system is secure on the assumption that the DDH problem is difficult in a random oracle model.

[Lemma 1] The embodiment system has correctness.

[Lemma 2] The embodiment system has anonymity on the assumption that the DDH problem is difficult in the random oracle model.

[Lemma 3] The embodiment system has traceability on the assumption that the discrete logarithm problem is difficult in the random oracle model.

[Lemma 4] The embodiment system has weak non-frameability on the assumption that the discrete logarithm problem is difficult in the random oracle model.

<Efficiency of Embodiment System>

(Comparison of Efficiency with RSA-based System)

To evaluate the efficiency of the embodiment system, there are considered the calculation amounts and data lengths of a conventional group signature system and the embodiment system in a case where the calculation amount of the signature generation of the RSA signature system, which is a usual electronic signature, is defined as a reference.

The embodiment system is compared with the [CG04] system, which is a very fast conventional group signature system. The speed of the [CG04] system is 26 times or more that of the [ACJT00] system. The [CG04] system includes three systems, but two of them, i.e., a basic system which does not have any revoking function and the VLR (originally, full-revocation) system having the revoking function are compared with the embodiment system.

Hereinafter, a way of thinking of a calculation amount comparison method will first be summarized.

A large part of the calculation amount of the comparative system is required for modular exponentiation. Therefore, the amount of calculation other than the modular exponentiation is ignored, and the calculation amount of the modular exponentiation is noted.

The calculation amount of the modular exponentiation is proportional to (the bit length of divisor)$^2 \times$the bit length of the exponent. Therefore, when the bit length of the divisor is the same, the whole calculation amount is proportional to the sum of the bit lengths of the exponents.

Moreover, when the factorization into prime factors of the divisor is known, the Chinese remainder theorem (CRT) can be utilized. Therefore, in a case where the factorization into prime factors is not known and RSA modulus (n=pq, in which p and q: primes, and p≈q) is as follows: the calculation amount is from about ¼ to ⅓. Here, the calculation amount is defined as ¼ to estimate the calculation amount.

Furthermore, a simultaneous multiple exponentiation process as the high-speed processing technique of the exponentiation is utilized, whereby calculation in the form of $\Pi_i G_1\hat{\ }\{e_i\}$ can be processed with the same calculation amount level as that of calculation of $Gj\hat{\ }$, in which $\max_i(\{e_i\})=e_j$.

As to a security parameter during comparison, the use of the recommended parameter of the [CG04] system is regarded as a reference case. As the recommended parameter, an RSA modulus of 2048 bits is utilized, and hence the RSA modulus of 2048 bits is similarly utilized in the RSA system. As to the multiplication cyclic group G utilized in the embodiment system, two parameters, i.e., $Z_p$ and an elliptic curve are utilized. As to $Z_p^*$, a partial group of $Z_p^*$ is utilized, in which p is a prime of 2048 bits and q for dividing p−1 is a prime of 224 bits. The values of p and q are also utilized in a draft of federal information processing standard (FIPS) 186-3, and can be regarded as the security parameter of the same degree as the RSA modulus of 2048 bits. As the elliptic curve, there is utilized an elliptic curve generated from the prime of 224 bits which is the equivalent security parameter.

In consideration of the above, the calculation amount and data length of the main processing of each of the RSA signature system, the [CG04] system and the embodiment system are shown in FIG. 21. It is to be noted that the signature generating calculation amount and signature verifying calculation amount indicate the sum of the bit lengths of the exponents. When CRT can be utilized, the calculation amount is ¼. The signature verifying calculation amount of the RSA system depends on the length of a public key d, and is usually small. The signature key length of the RSA system is a value in a case where the system has primes p and q and a private key e. The verification key length of the RSA system is a value in a case where the public key d is made small.

The signature generating calculation amount of the embodiment system is four times that of the RSA system, and hence the amount is suppressed as compared with the [CG04] system in which the amount is about eight times that of the RSA system. In consequence, the signature generation of the embodiment system can be executed at a high speed.

The signature key length (the member private key length) of the embodiment system is ⅑ that of the RSA system, and hence the length becomes short as compared with the [CG04] system in which the length is about 1.1 times that of the RSA system.

It is to be noted that the group private key length of the embodiment system is larger than that of the [CG04] system. However, the increase of the group private key length does not influence the calculation amounts of the apparatuses $20_1$ to $20_n$ and 30 other than the group administrator apparatus 10. The group administrator apparatus is usually a high-performance high-reliability calculator or the like, and there are less restrictions on the calculation amount as compared with the signer apparatus and the verifier apparatus. The group administrator apparatus does not have any practical problem.

Moreover, when the embodiment system is mounted as an elliptic curve encryption system, the signature length is substantially the same as that of the RSA system. Therefore, as compared with the [CG04] system, the signature length can noticeably be shortened.

That is, in the embodiment system, as compared with the [CG04] system, the signature key length and verification key length are smaller, and the signature generation and signature verification can be executed at a higher speed. This is because the embodiment system is a complete discrete logarithm-based system in which the prime order q is used as the divisor, whereas the [CG04] system is an RSA-based system in which a composite number n=pq is used as the divisor.

For example, in the discrete logarithm-based system, when the divisor is of 2048 bits in the calculation of $Y=G^x \mod q$, a discrete logarithm x is of about 224 bits.

On the other hand, in the RSA-based system, when the divisor n is of 2048 bits in calculation $C=m^e \mod n$, the public key e is also of about 2048 bits. Therefore, in the RSA-based [CG04] system, unlike the embodiment system, the shortening of the key length and the speedup of the calculation cannot be achieved.

(Comparison of Efficiency with Bilinear Group Based-System)

When a bilinear image is mounted on [FI05] and [DP06] systems utilizing the bilinear image, a calculation speed noticeably varies, and hence the systems cannot simply be compared, but these systems also have the same degree of speed as that of the [CG04] system, even when taking the fastest bilinear image mounting technology into consideration. Therefore, it is seen from the result of the comparison with the above [CG04] system that the embodiment system has a higher speed even when compared with these systems.

As described above, according to the present embodiment, the complete discrete logarithm-based group signature system is realized by using the multiplication cyclic group gG of the prime order q, the representation parts $k_{i1}$ and $k_{i2}$ are used as the private key, and the part $k_{i1}$ of the representation of the revoked member is included in the revocation list RL, whereby the calculation amount can be decreased to improve the calculation speed as compared with the conventional [CG04] system, while realizing the revoking function.

For example, according to the present embodiment, since the complete discrete logarithm-based system is realized, as shown in FIG. 21, it is possible to realize a group signature system having a very high speed and a short data length to such an extent that such properties cannot be achieved by the RSA-based [CG04] system.

Additionally, in the group administrator apparatus 10, the group public key includes the values $G_1$, $G_2$ and F, whereby the group signature can efficiently be generated. Moreover, the group private key includes values a and b, whereby the member private keys corresponding to n members can efficiently be generated.

In the signer apparatus $20_i$, the signer tracing information $T_i$ based on the part $k_{i1}$ of the representation can be used to efficiently generate the zero-knowledge proof. That is, the representation itself is not used, but the value uniquely calculated from the representation is used as the signer tracing information, whereby the generation and verification efficiencies of the zero-knowledge proof can be increased.

In the verifier apparatus 30, the revoke verification processing can efficiently be performed based on the part $k_{i1}$ of the representation included in the revocation list.

In the verifier apparatus 30 and the group administrator apparatus 10, the group signature σ includes the zero-knowledge proof, and hence the zero-knowledge proof can efficiently be verified. In consequence, the group signature σ can efficiently be verified.

Furthermore, in the group administrator apparatus 10, the group signature σ includes the ciphertext data of the signer tracing information $T_i$, and hence the signer tracing information $T_i$ can be obtained only by decrypting the ciphertext data, whereby the signer can efficiently be traced.

Moreover, according to the present embodiment, the first practical group signature system can be realized based on the DDH problem.

Furthermore, according to the present embodiment, since the base of the exponentiation during the signature generation is fixed, the calculation table of the simultaneous multiple exponentiation process can beforehand be calculated to efficiently execute the exponentiation.

In addition, according to the present embodiment, the weak non-frameability and self-traceability are also realized.

(Second Embodiment)

Figure 23:
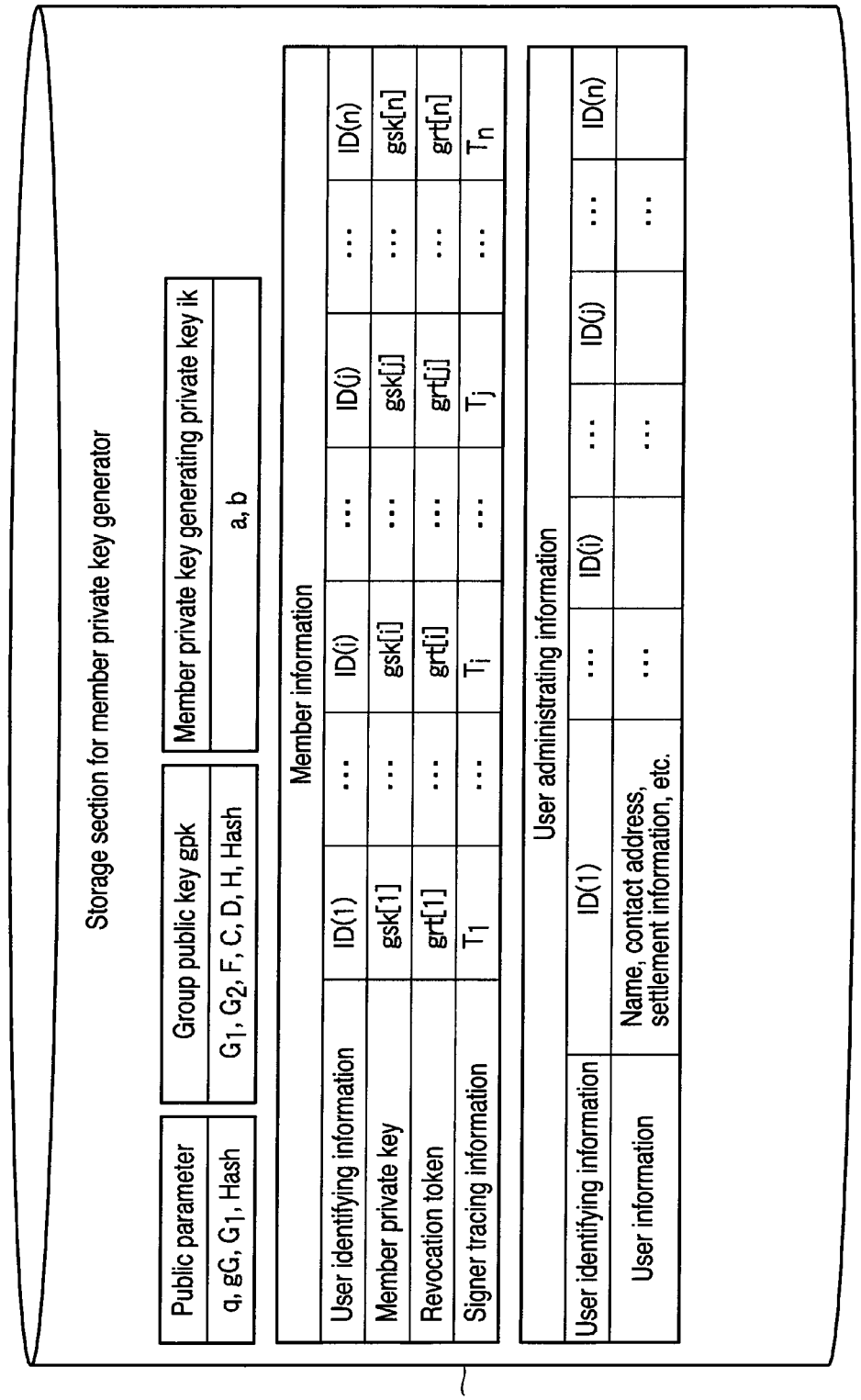
FIG. 23 is an exemplary diagram showing the constitution of a storage section for a member private key generator in the embodiment.
Figure 27:
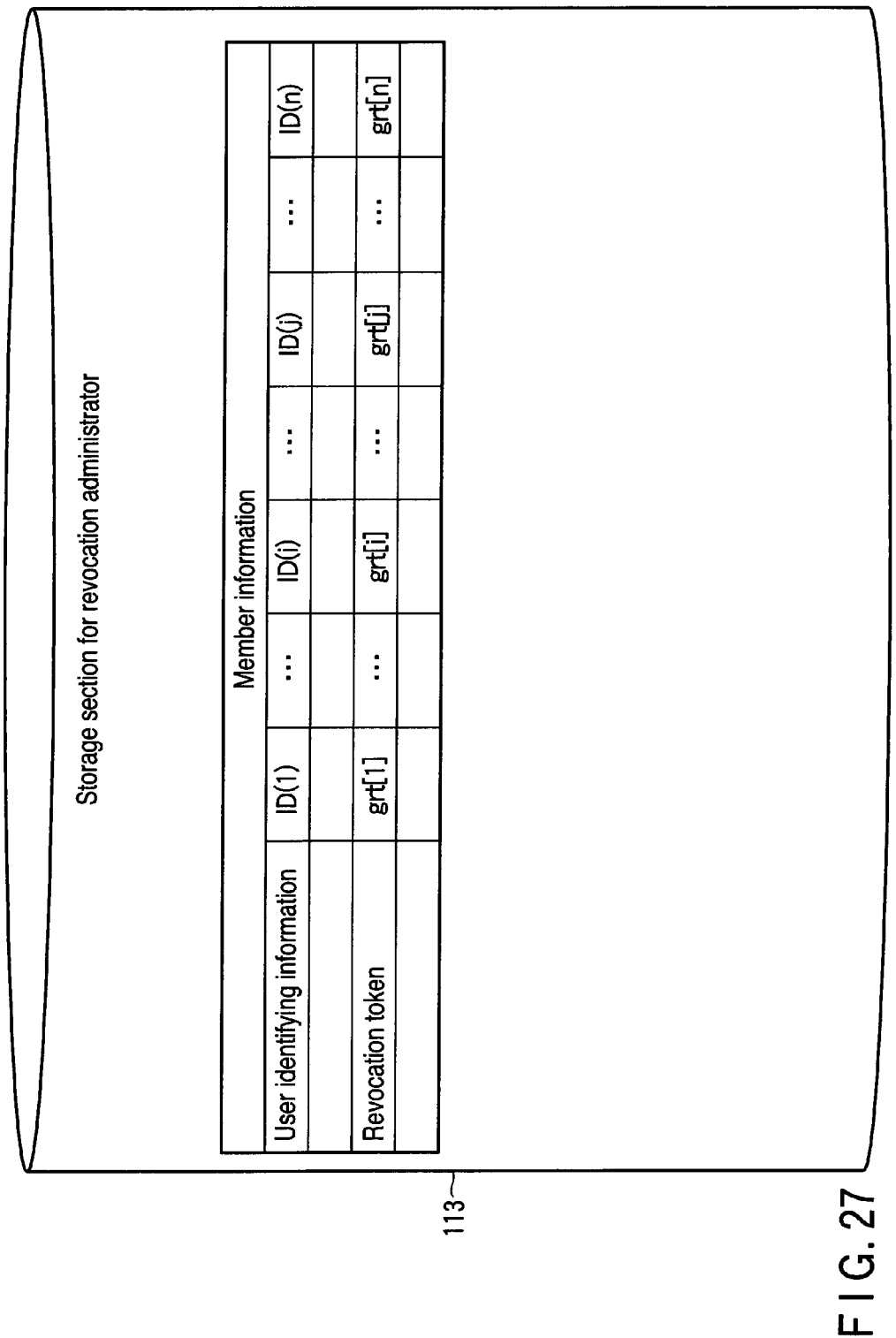
FIG. 27 is an exemplary diagram showing the constitution of a storage section for a revocation administrator in the embodiment.

FIGS. 22 and 23 are exemplary diagrams showing constitutions of a member private key generator apparatus and a storage section of the apparatus according to a second embodiment of the present invention. FIGS. 24 and 25 are exemplary diagrams showing constitutions of a signer tracing apparatus and a storage section of the apparatus. FIGS. 26 and 27 are exemplary diagrams showing constitutions of a representation administrator apparatus and a storage section of the apparatus. In FIGS. 22 to 27, the same function as the above function is denoted with the same reference numerals as those of the above diagrams, detailed description thereof is omitted, and a different part will mainly be described here. It is to be noted that in the following embodiment, redundant description is similarly omitted.

First, the group administrator apparatus 10 of the first embodiment has a plurality of different functions of the group key generating section 14, the member private key generating section 15, the signature verifying section 16, the signer tracing section 17 and the revocation list generating section 18 in addition to the input section 12, output section 19 and communicating section 13 having generally used functions as shown in FIG. 2. On the other hand, in the second embodiment, a member private key generator apparatus 101, a signer tracing apparatus 102 and a revocation administrator apparatus 103 are separated from the group administrator apparatus 10 shown in FIG. 2, as shown in FIGS. 22, 24 and 26. It is to be noted that although not shown, a group administrator apparatus 10' from which the apparatuses 101 to 103 have been separated comprises a storage section 11 for a group administrator, an input section 12, a communicating section 13, a group key generating section 14 and an output section 19.

Here, as shown in FIG. 22, the member private key generator apparatus 101 comprises a storage section 111 for a member private key generator, an input section 12, a communicating section 13, a member private key generating section 15 and an output section 19. Additionally, the member private key generator apparatus 101 is specialized in member private key generation, and does not comprise the group key generating section 14, the signature verifying section 16, the signer tracing section 17 and the revocation list generating section 18.

Moreover, in the storage section 111 for the member private key generator, as shown in FIG. 23, a public parameter, a group public key, a member private key generating private key ik, member information (user identifying information, a member private key, a revocation token and signer tracing information) and user administrating information are stored. Additionally, in the storage section 111 for the member private key generator, a signer tracing private key, a message, a group signature, signer information and a calculation table are not stored.

The member private key generator apparatus 101 can communicate with the signer tracing apparatus 102, the revocation administrator apparatus 103, a signer apparatus $20_i$ and a verifier apparatus 30 in which a group signature system is used.

Moreover, in the storage section 111 for the member private key generator, for example, the public parameter including a prime order q used in the group signature system and a generator $G_i$ of a multiplication cyclic group gG of q is stored. A group private key including values a and $b \in Z_q^*$ and the group public key including values $G_2$, F and a generator $G_i$ (with the proviso that $G = G_1^a$ and $F = G_1^b$) are stored. In associate in with user identifying information ID(i), a member private key ($k_{i1}$, $k_{i2}$), a part $k_{i1}$ of the representation of the member private key and signer tracing information $T_i$ are stored. When a revocation list including the part $k_{i1}$ of the representation corresponding to a revoked member is received by the member private key generator apparatus 101 from the revocation administrator apparatus 103, the storage section 111 for the member private key generator stores the revocation list. It is to be noted that when no member is revoked, no revocation list is generated, and hence no revocation list is stored in the apparatuses 101 to 103 and 30.

The member private key generating section 15 of the member private key generator apparatus 101 has, for example, a function of calculating the member private key constituted of the representation parts $k_{i1}$ and $k_{i2}$ satisfying a relational equation $F = G_1 \hat{\ } \{k_{i1}\} G_2 \hat{\ } \{k_{i2}\}$ based on the group private key, the group public key and a relational equation $k_{i1} = b - ak_{i2}$ mod q for each piece of the user identifying information ID(i), a function of calculating the signer tracing information $T_i = G_1 \hat{\ } \{k_{i1}\}$ based on the member private key and the generator $G_1$, and a function of writing the calculated member private key and signer tracing information $T_i$ in association with the user identifying information ID(i) in the storage section 111 for the member private key generator.

The communicating section 13 of the member private key generator apparatus 101 has, for example, a function of transmitting, to the signer apparatus $20_i$, the public parameter, group public key, member private key and signer tracing information $T_i$ for generating the group signature in the group signature system; a function of transmitting, to the signer tracing apparatus 102, the public parameter, group public key and signer tracing information $T_i$ for tracing the signer in the group signature system; a function of transmitting, to the revocation administrator apparatus 103, the user identifying information ID(i) and the part $k_{i1}$ of the representation in the storage section 111 for the member private key generator; and a function of transmitting, to the verifier apparatus 30, the public parameter and group public key for verifying the group signature in the group signature system.

As shown in FIG. 24, the signer tracing apparatus 102 comprises a storage section 112 for the signer tracing apparatus, an input section 12, a communicating section 13, a signature verifying section 16, a signer tracing section 17 and an output section 19. Additionally, the signer tracing apparatus 102 is specialized in signer tracing, and does not comprise the member private key generating section 15 and the revocation list generating section 18.

Moreover, in the storage section 112 for the signer tracing apparatus, as shown in FIG. 25, a public parameter, a group public key, a signer tracing private key ok, member information (user identifying information, a revocation token and signer tracing information) a message, a group signature σ, a calculation table and signer information are stored. Additionally, in the storage section 112 for the signer tracing apparatus, a member private key generating private key, a member private key of the member information and user administrating information are not stored.

The signer tracing apparatus 102 having such a constitution can communicate with the member private key generator apparatus 101, the revocation administrator apparatus 103 and the verifier apparatus 30 in which the group signature system is used.

In the storage section 112 for the signer tracing apparatus, for example, the public parameter including a prime order q used in the group signature system and a generator $G_1$ of a multiplication cyclic group gG of q is stored. The signer tracing private key including values $x_1$, $x_2$, $y_1$, $y_2$ and $z \in Z_q^*$ and the group public key including values $G_2$, F, C, D, H, the generator $G_1$ and a hash function Hash (with the proviso that $G_2 = G_1^a$, $F = G_1^b$, a, $b \in Z_q^*$, $C = G_1 \hat{\ } \{x_1\} G_2 \hat{\ } \{x_2\}$, $D = G_1 \hat{\ } \{y_1\} G_2 \hat{\ } \{y_2\}$ and $H = G_1^z$) are stored. The user identifying information ID(i) received by the communicating section 13, the part $k_{i1}$ of the representation and the signer tracing information $T_i$ are stored in association with one another.

Moreover, when the revocation list including the part $k_{i1}$ of the representation corresponding to the revoked member is received by the signer tracing apparatus 102 from the revocation administrator apparatus 103, the storage section 112 for the signer tracing apparatus stores the revocation list.

The communicating section 13 of the signer tracing apparatus 102 has, for example, a function of receiving, from the member private key generator apparatus 101, the signer tracing information $T_i = G_1 \hat{\ } \{k_{i1}\}$ generated based on the member private key generating private key including values a and b, the group public key and the relational equation $k_{i1} = b - ak_{i2}$ mod q and calculated based on the member private key constituted of the representation parts $k_{i1}$ and $k_{i2}$ satisfying the relational equation $F = G_1 \hat{\ } \{k_{i1}\} G_2 \hat{\ } \{k_{i2}\}$ and the generator $G_1$ for each piece of the user identifying information ID(i); the part $k_{i1}$ of the representation; and the user identifying information ID(i).

The signature verifying section 16 of the signer tracing apparatus 102 has a function of verifying the correctness of the group signature based on the public parameter and the group public key, when receiving the message from the verifier apparatus 30 and receiving the group signature including values E and $U_1$ (with the proviso that $E = H^r T_i$ and $U_1 = G_1^r$, in which r is a random number) and a signer tracing request from the communicating section 13.

The signer tracing section 17 of the signer tracing apparatus 102 has a function of calculating the signer tracing information $T_i = E/U_1^z$ based on the group signature and the signer tracing private key, when the group signature indicates correctness as the result of the verification by the signature verifying section 16; and a function of searching the storage section 112 for the signer tracing apparatus based on the calculated signer tracing information $T_i$ to specify the user identifying information ID(i) corresponding to the signer tracing information $T_i$.

The output section 19 of the signer tracing apparatus 102 has a function of outputting the user identifying information ID(i) specified by the signer tracing section 17.

As shown in FIG. 26, the revocation administrator apparatus 103 comprises a storage section 113 for a revocation administrator, an input section 12, a communicating section 13, a revocation list generating section 18 and an output section 19. Additionally, the revocation administrator apparatus 103 is specialized in revocation administration, and does not comprise the member private key generating section 15, the signature verifying section 16 and the signer tracing section 17.

Moreover, in the storage section 113 for the revocation administrator, as shown in FIG. 27, member information (user identifying information and a revocation token) is stored. Additionally, in the storage section 113 for the revocation administrator, no public parameter, group public key, member private key generating private key, signer tracing private key, member private key and signer tracing information of member information, user administrating information, message, group signature, signer information or calculation table is stored.

The revocation administrator apparatus 103 having such a constitution can communicate with the member private key generator apparatus 101, the signer tracing apparatus 102, the signer apparatus $20_i$ and the verifier apparatus 30 in which the group signature system is used.

The storage section 113 for the revocation administrator stores the user identifying information ID(i) and the part $k_{i1}$ of the representation received by the communicating section 13 in association with each other.

The revocation list generating section 18 of the revocation administrator apparatus 103 has a function of generating a revocation list including the part $k_{i1}$ of the corresponding representation in the storage section 113 for the revocation administrator based on the input user identifying information ID(i) in a case where the user identifying information ID(i) indicating the revoked member is input from the input section 12.

The communicating section 13 of the revocation administrator apparatus 103 has a function of receiving, from the member private key generator apparatus 101, the part $k_{i1}$ of the representation and the user identifying information ID(i) associated with each other, when the member private key generator apparatus 101 generates the member private key constituted of representation parts $k_{i1}$ and $k_{i2}$ satisfying the relational equation $F=G_1\hat{}\{k_{i1}\}G_2\hat{}\{k_{i2}\}$ based on a relational equation $k_{i1}=b-ak_{i2}$ mod q for each piece of the user identifying information ID(i), based on the public parameter including the prime order q used in the group signature system and the generator $G_1$ of the multiplication cyclic group gG of q, the private key generating private key including values a and $b \in Z_q^*$ and the group public key including values $G_2$ and F and the generator $G_1$ (with the proviso that $G_2=G_1^a$ and $F=G_1^b$); and a function of transmitting the revocation list generated by the revocation list generating section 18 to the verifier apparatus 30.

According to the above constitution, an apparatus can be divided by functions possessed by the group administrator. The group administrator apparatus 10 in the first embodiment has a plurality of different functions of the group key generating section 14, the member private key generating section 15, the signature verifying section 16, the signer tracing section 17 and the revocation list generating section 18, but timings, frequencies and loads, with which the functions except signature verification and signer tracing are utilized, are all different. Therefore, from the viewpoints of load scattering and system operation/administration, the apparatus can preferably be divided by the functions sometimes. Moreover, it is possible to expect an effect that the minimum information necessary for these functions can be administered to realize a higher security. For example, even when the revocation administrator apparatus 103 or the signer tracing apparatus 102 is utilized, no member private key can be generated, and illegal signature forgery cannot be performed.

Moreover, the group administrator function can be divided by the member private key generator, the signer tracer and the revocation administrator, and weak non-frameability obtained by slightly weakening conventional non-frameability and self-traceability can simultaneously be realized, whereby a higher security and a flexible system operation/administration can be realized.

(Third Embodiment)

FIGS. 28 and 29 are exemplary diagrams showing constitutions of a signer identity proving apparatus and a storage section of the apparatus according to a third embodiment of the present invention.

First, as shown in FIG. 4, the signer apparatus $20_i$ in the first embodiment has a plurality of different functions of the message preparing section 24, the group signature generating section 25 and the signer identity proving section 26 in addition to the input section 22, the output section 27 and the communicating section 23 having universally utilized functions. On the other hand, as shown in FIGS. 28 and 29, the third embodiment has a constitution in which a signer identity proving apparatus $201_i$ is extracted from the signer apparatus $20_i$ shown in FIG. 4.

As shown in FIG. 28, the signer identity proving apparatus $201_i$ comprises a signer identity proving confidential information storage section 211, a communicating section 23 and a signer identity proving section 26. Additionally, the signer identity proving apparatus $201_i$ is specialized in signer identity proving, and does not comprise the input section 22, the output section 27, the message preparing section 24 or the group signature generating section 25.

Moreover, as shown in FIG. 29, the signer identity proving confidential information storage section 211 stores a part $k_{i1}$ of a member private key. Additionally, in the signer identity proving confidential information storage section 211, no public parameter, group public key, calculation table, another part $k_{i2}$ of the member private key, signer tracing information, message and group signature are stored.

The signer identity proving apparatus $201_i$ having such a constitution can communicate with the group administrator apparatus 10, the signer apparatus $20_i$ and the verifier apparatus 30 in which the group signature system is used.

The signer identity proving confidential information storage section 211 stores the part $k_{i1}$ of the representation in the member private key generated by the group administrator apparatus 10 for each piece of user identifying information ID(i).

The signer identity proving section 26 of the signer identity proving apparatus $201_i$ has, for example, a function of selecting a random number $r_1 \in Z_q^*$ based on a public parameter including a prime order q used in the group signature system and a generator $G_1$ of a multiplication cyclic group gG of q; a function of calculating a commitment $R'=U_1\hat{}\{r_1\}$ of a zero-knowledge proof based on a value $U_1$ in a group signature $\sigma$ and the selected random number $r_1$, when the communicating section 23 receives, from the signer apparatus $20_i$, the group signature $\sigma$ including the values R and $U_1$ (with the proviso that $R=T_i^r$, $U_1=G_1^r$ and $T_i=G_1^r$, in which r is a random number); and a function of calculating a parameter $s_1'=r_1+\delta k_{i1}$ mod q, which becomes a response to the zero knowledge proof, based on a random number $\delta$ which becomes a challenge, the random number $r_1$, a part $k_{i1}$ of a representation and the prime order q.

The communicating section 23 of the signer identity proving apparatus $201_i$ has a function of transmitting, to the verifier apparatus 30, the commitment R' calculated by the signer identity proving section 26; a function of receiving, from the verifier apparatus 30, the random number $\delta \in Z_q^*$ which becomes the challenge of the zero-knowledge proof; and a function of transmitting the parameter $s_1'$ calculated by the signer identity proving section 26 to the verifier apparatus 30 which can verify a verifying equation $R'=R\hat{}\{-\delta\}U_1\hat{}s_1'$.

According to the above constitution, the signer identity proving apparatus $201_i$ can be disposed independently of the signer apparatus $20_i$. In the signer identity proving confidential information storage section 211, the part $k_{i1}$ of the member private key is only stored, and no signature can be generated only by the part $k_{i1}$ of the member private key, whereby even if the signer identity proving apparatus $201_i$ is lost or stolen and illegally analyzed, user's damage can be minimized. This also enables a system operation in which a personal computer (PC) securely administered at home is used as the signer apparatus $20_i$ to generate the signature, and an easily portable cellular phone or IC card is used as the signer identity proving apparatus $201_i$ to perform signer identity proving process.

Moreover, a signature generator function can be divided by the signer generator and a signer identity prover, and weak non-frameability obtained by slightly weakening conventional non-frameability and self-traceability can simultaneously be realized, whereby a higher security and flexible system operation/administration can be realized.

The method described in the embodiment can also be stored in a storage medium such as a magnetic disk (floppy (trademark) disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the present invention includes not only a medium independent of a computer but also a storage medium in which a program transmitted through a LAN, the Internet, or the like is downloaded and stored or temporarily stored.

The number of storage media is not limited to one. A case in which the process in the embodiment is executed from a plurality of media is included in the storage medium according to the present invention. Any medium configuration may be used.

A computer according to the present invention is to execute the processes in the embodiments on the basis of the program stored in a storage medium. The computer may have any configuration such as one apparatus constituted by a personal computer or a system in which a plurality of apparatuses are connected by a network.

A computer in the present invention includes not only a personal computer but also an arithmetic processing apparatus, a microcomputer, or the like included in an information processing apparatus. The computer is a generic name of an apparatus and a device which can realize the functions of the present invention by a program.

The present invention is not limited to the embodiments. The invention can be embodied by changing the constituent elements in an execution phase without departing from the spirit and scope of the invention. In addition, various inventions can be formed by appropriate combinations of the plurality of constituent elements disclosed in the embodiments. For example, several constituent elements may be deleted from all the constituent elements described in the embodiments. Furthermore, the constituent elements over the different embodiments may be appropriately combined with each other.

As described above, according to the present invention, a calculation amount can be decreased to improve a calculation speed, while realizing a revoking function.

What is claimed is:

1. A group signature system comprising a group administrator apparatus, a signer apparatus and a verifier apparatus which are configured to communicate with one another and which use a group signature method, wherein the group administrator apparatus comprises:
a parameter storage device configured to store a public parameter including a prime order q used in the group signature method and a generator $G_1$ of a multiplication cyclic group gG of the above q;
a group key generation device configured to generate a group private key including values a and $b \in Z_q^*$, and a group public key including values $G_2$ and F satisfying a first relational equation $G_2 = G_1^a$ and a second relational equation $F = G_1^b$ and the generator $G_1$, based on the public parameter in the parameter storage device;
a member private key generation device configured to calculate a member private key including representation parts $k_{i1}$ and $k_{i2}$ satisfying a fourth relational equation $F = G_1^{\{k_{i1}\}} G_2^{\{k_{i2}\}}$, based on the group private key, the group public key and a third relational equation $k_{i1} = b - a k_{i2} \mod q$ (with the proviso that ^ is a symbol indicating an exponentiation);
a signer tracing information calculating device configured to calculate signer tracing information $T_i = G_1^{\{k_{i1}\}}$ based on the member private key and the generator $G_1$;
a revocation list generation device configured to generate a revocation list including the part $k_{i1}$ of the representation corresponding to a revoked member; and
a device configured to transmit the revocation list to the verifier apparatus, the signer apparatus comprises:
a storage device for a signer in which the public parameter including the prime order q used in the group signature method and the generator $g_1$ of the multiplication cyclic group gG of the above q, the group public key, the member private key, the signer tracing information $T_i$ and a message are stored;
a ciphertext generation device configured to encrypt the signer tracing information $T_i$ based on the public parameter and the group public key in the storage device for the signer to generate ciphertext data of the signer tracing information $T_i$;
a zero-knowledge proof generation device configured to generate a zero-knowledge proof indicating that the member private key is known and that the ciphertext data is correctly generated based on the signer tracing information $T_i$, based on the public parameter, the group public key, the member private key and the message in the storage device for the signer and the ciphertext data of the signer tracing information $T_i$; and
a device configured to transmit, to the verifier apparatus, a group signature including the ciphertext data and the zero-knowledge proof, and the message, and the verifier apparatus comprises:
a storage device for a verifier in which the public parameter including the prime order q used in the group signature method and the generator $g_1$ of the multiplication cyclic group gG of the above q and the group public key are stored;
a device configured to receive the revocation list from the group administrator apparatus and receiving the group signature and a message from the signer apparatus, respectively;
a verification device configured to verify the correctness of the group signature based on the received revocation list, group signature and message, and the public parameter and group public key in the storage device for the verifier; and a device configured to transmit the verified result to the signer apparatus.

2. A group administrator apparatus which is configured to communicate with a signer apparatus and a verifier apparatus using a group signature method, the group administrator apparatus comprising:

a parameter storage device configured to store a public parameter including a prime order q used in the group signature method and a generator $G_1$ of a multiplication cyclic group gG of the above q;

a group key generation device configured to generate a group private key including values a and $b \in Z_q^*$, and a group public key including values $G_2$ and F satisfying a first relational equation $G_2 = G_1^a$ and a second relational equation $F = G_1^b$ and the generator $G_1$, based on the public parameter in the parameter storage device;

a member private key generation device configured to calculate a member private key including representation parts $k_{i1}$ and $k_{i2}$ satisfying a fourth relational equation $F = G_1\hat{\ }\{k_{i1}\}G_2\hat{\ }\{k_{i2}\}$, based on the group private key, the group public key and a third relational equation $k_{i1} = b - ak_{i2} \mod q$ (with the proviso that $\hat{\ }$ is a symbol indicating an exponentiation);

a signer tracing information calculating device configured to calculate signer tracing information $T_i = G_1\hat{\ }\{k_{i1}\}$ based on the member private key and the generator $G_1$;

a device configured to transmit, to the signer apparatus, the public parameter, the group public key, the member private key and the signer tracing information $T_i$ to generate a group signature in the group signature method;

a revocation list generation device configured to generate a revocation list including the part $k_{i1}$ of the representation corresponding to a revoked member; and a device configured to transmit, to the verifier apparatus, the public parameter, the group public key and the revocation list to verify the group signature in the group signature method.

3. A verifier apparatus which is configured to communicate with a group administrator apparatus and a signer apparatus using a group signature method, the verifier apparatus comprising:

a device configured to receive, from the group administrator apparatus, a public parameter including a prime order q used in the group signature method and a generator $G_1$ of a multiplication cyclic group gG of the above q, a group public key including values $G_2$ and F generated to satisfy values a and $b \in Z_q^*$, a first relational equation $G_2 = G_1^a$ and a second relational equation $F = G_1^b$ based on the public parameter and including the generator $G_1$, and a revocation list including a part $k_{i1}$ of a representation corresponding to a revoked member;

a storage device for a verifier in which the received public parameter and the received group public key are stored;

a device configured to receive, from the signer apparatus, a group signature including a zero-knowledge proof indicating that a member private key is known and that ciphertext data is correctly generated based on signer tracing information $T_i$, with respect to the member private key including representation parts $k_{i1}$ and $k_{i2}$ generated to satisfy a fourth relational equation $F = G_1\hat{\ }\{k_{i1}\}G_2\hat{\ }\{k_{i2}\}$ based on the values a and $b \in Z_q^*$, the group public key and a third relational equation $k_{i1} = b - ak_{i2} \mod q$ (with the proviso that $\hat{\ }$ is a symbol indicating an exponentiation) and the signer tracing information $T_i = G_1\hat{\ }\{k_{i1}\}$ generated based on the member private key and the generator $G_1$, and including the ciphertext data of the signer tracing information $T_i$, and a message;

a verification device configured to verify the correctness of the group signature, based on the received revocation list, group signature and message, and the public parameter and group public key in the storage device for the verifier; and a device configured to transmit the verified result to the signer apparatus, wherein the ciphertext data is obtained by encrypting the signer tracing information $T_i$ by the signer apparatus based on the public parameter and the group public key, and the zero-knowledge proof is data generated by the signer apparatus based on the public parameter, the group public key, the member private key, the message, and the ciphertext data of the signer tracing information $T_i$.

4. A non-transitory computer-readable storage medium (M) storing a program executed by a computer which is a group administrator apparatus configured to communicate with a signer apparatus and a verifier apparatus using a group signature method, the program comprising:

a program code which allows the computer to execute processing of writing, in a memory of the computer, a public parameter including a prime order q used in the group signature method and a generator $G_1$ of a multiplication cyclic group gG of the above q;

a program code which allows the computer to execute group key generation processing of generating a group private key including values a and $b \in Z_q^*$, and a group public key including values $G_2$ and F satisfying a first relational equation $G_2 = G_1^a$ and a second relational equation $F = G_1^b$ and including the generator $G_1$, based on the public parameter in the memory;

a program code which allows the computer to execute member private key generation processing of calculating a member private key including representation parts $k_{i1}$ and $k_{i2}$ satisfying a fourth relational equation $F = G_1\hat{\ }\{k_{i1}\}G_2\hat{\ }\{k_{i2}\}$, based on the group private key, the group public key and a third relational equation $k_{i1} = b - ak_{i2} \mod q$ (with the proviso that $\hat{\ }$ is a symbol indicating an exponentiation);

a program code which allows the computer to execute signer tracing information calculation processing of calculating signer tracing information $T_i = G_1\hat{\ }\{k_{i1}\}$ based on the member private key and the generator $G_1$;

a program code which allows the computer to execute processing of transmitting, to the signer apparatus, the public parameter, the group public key, the member private key and the signer tracing information $T_i$ to generate a group signature in the group signature method;

a program code which allows the computer to execute revocation list generation processing of generating a revocation list including the part $k_{i1}$ of the representation corresponding to a revoked member; and a program code which allows the computer to execute processing of transmitting, to the verifier apparatus, the public parameter, the group public key and the revocation list to verify the group signature in the group signature method.

5. A non-transitory computer-readable storage medium (M) storing a program executed by a computer which is a signer apparatus configured to communicate with a group administrator apparatus and a verifier apparatus using a group signature method, the program comprising:

a program code which allows the computer to execute processing of receiving, from the group administrator apparatus, a public parameter including a prime order q used in the group signature method and a generator $G_1$ of a multiplication cyclic group gG of the above q, a group public key including values $G_2$ and F generated to satisfy values a and $b \in Z_q$, a first relational equation $G_2=G_1{}^a$ and a second relational equation $F=G_1{}^b$ based on the public parameter and including the generator $G_1$, and a revocation list including a part $k_{i1}$ of a representation corresponding to a revoked member;

a program code which allows the computer to execute processing of writing the received public parameter and the received group public key in a memory of the computer;

a program code which allows the computer to execute processing of receiving, from the signer apparatus, a group signature including a zero-knowledge proof indicating that a member private key is known and that ciphertext data is correctly generated based on signer tracing information $T_i$, with respect to the member private key including representation parts $k_{i1}$ and $k_{i2}$ generated to satisfy a fourth relational equation $F=G_1\hat{}\{k_{i1}\}G_2\hat{}\{k_{i2}\}$ based on the values a and $b \in Z_q{}^*$, the group public key and a third relational equation $k_{i1}=b-ak_{i2}$ mod q (with the proviso that ^ is a symbol indicating an exponentiation) and the signer tracing information $T_i=G_1\hat{}\{k_{i1}\}$ generated based on the member private key and the generator $G_1$, and including the ciphertext data of the signer tracing information $T_i$, and a message;

a program code which allows the computer to execute verification processing of verifying the correctness of the group signature based on the received revocation list, group signature and message, and the public parameter and group public key in the memory; and a program code which allows the computer to execute processing of transmitting the verified result to the signer apparatus, wherein the ciphertext data is obtained by encrypting the signer tracing information $T_i$ by the signer apparatus based on the public parameter and the group public key, and the zero-knowledge proof is data generated by the signer apparatus based on the public parameter, the group public key, the member private key and the message, and the ciphertext data of the signer tracing information $T_i$.

6. A member private key generator apparatus which is configured to communicate with a signer tracing apparatus, a revocation administrator apparatus, a signer apparatus and a verifier apparatus using a group signature method, the apparatus comprising:

a parameter storage device in which a public parameter including a prime order q used in the group signature method and a generator $G_1$ of a multiplication cyclic group gG of the above q is stored;

a group key storage device in which a group private key including values a and $b \in Z_q{}^*$ and a group public key including values $G_2$ and F and the generator $G_1$ (with the proviso that $G_2=G_1{}^a$ and $F=G_1{}^b$) are stored;

a member private key generation device configured to calculate a member private key including representation parts $k_{i1}$ and $k_{i2}$ satisfying a relational equation $F=G_1\hat{}\{k_{i1}\}G_2\hat{}\{k_{i2}\}$, based on the group private key, the group public key and a relational equation $k_{i1}=b-ak_{i2}$ mod q for each piece of user identifying information ID(i) (with the proviso that ^ is a symbol indicating an exponentiation);

a signer tracing information calculating device configured to calculate signer tracing information $T_i=G_1\hat{}\{k_{i1}\}$ based on the member private key and the generator $G_1$;

a member information storage device in which the member private key ($k_{i1}$, $k_{i2}$), the part $k_{i1}$ of the representation of the member private key and the signer tracing information $T_i$ are stored in association with the user identifying information ID(i);

a device configured to transmit, to the signer apparatus, the public parameter, the group public key, the member private key and the signer tracing information $T_i$ to generate a group signature in the group signature method;

a device configured to transmit, to the signer tracing apparatus, the public parameter, the group public key and the signer tracing information $T_i$ to trace a signer in the group signature method;

a device configured to transmit, to the revocation administrator apparatus, the user identifying information ID(i) and the part $k_{i1}$ of the representation in the member information storage device;

a revocation list storage device configured to receive, from the revocation administrator apparatus, a revocation list including the part $k_{i1}$ of the representation corresponding to a revoked member to store the revocation list; and a device configured to transmit, to the verifier apparatus, the public parameter and the group public key to verify the group signature in the group signature method.

7. A signer tracing apparatus which is configured to communicate with a member private key generator apparatus, a revocation administrator apparatus and a verifier apparatus using a group signature method, the signer tracing apparatus comprising:

a parameter storage device in which a public parameter including a prime order q used in the group signature method and a generator $G_1$ of a multiplication cyclic group gG of the above q is stored;

a key storage device in which a signer tracing private key including values $x_1$, $x_2$, $y_1$, $y_2$ and $z \in Z_q{}^*$ and a group public key including values $G_2$, F, C, D and H, the generator $G_1$ and a hash function Hash (with the proviso that $G_2=G_1{}^a$, $F=G_1{}^b$, a and $b \in Z_q{}^*$, $C=G_1\hat{}\{x_1\}G_2\hat{}\{x_2\}$, ^ is a symbol indicating an exponentiation, $D=G_1\hat{}\{y_1\}G_2\hat{}\{y_2\}$ and $H=G_1{}^z$) are stored;

a device configured to receive, from the member private key generator apparatus, signer tracing information $T_i=G_1\hat{}\{k_{i1}\}$ calculated based on a member private key generating private key including values a and b, the group public key, a member private key including representation parts $k_{i1}$ and $k_{i2}$ generated based on a relational equation $k_{i1}=b-ak_{i2}$ mod q and satisfying a relational equation $F=G_1\hat{}\{k_{i1}\}G_2\hat{}\{k_{i2}\}$ and signer tracing information $T_i=G_1\hat{}\{k_{i1}\}$ calculated based on the generator $G_1$, the part $k_{i1}$ of the representation, and user identifying information ID(i), for each piece of the user identifying information ID(i);

a member information storage device in which the received user identifying information ID(i), the part $k_{i1}$ of the representation and the signer tracing information $T_i$ are associated with one another and stored;

a revocation list storage device configured to receive, from the revocation administrator apparatus, a revocation list including the part $k_{i1}$ of the representation corresponding to a revoked member to store the revocation list;

a signature verification device configured to verify the correctness of a group signature based on the public parameter and the group public key, on receiving, from the verifier apparatus, a message, the group signature including values E and $U_1$ (with the proviso that $E=H^rT_i$, $U_1=G_1^r$ and r is a random number) and a signer tracing request;

a signer tracing information device configured to calculate signer tracing information $T_i=E/U_1^z$ based on the group signature and the signer tracing private key, when the group signature indicates the correctness as the result of the verification;

a device configured to search the member information storage device based on the calculated signer tracing information $T_i$ to specify the user identifying information ID(i) corresponding to the signer tracing information $T_i$; and an output device configured to output the specified user identifying information ID(i).

8. A revocation administrator apparatus which is configured to communicate with a member private key generator apparatus, a signer tracing apparatus, a signer apparatus and a verifier apparatus using a group signature method, the revocation administrator apparatus comprising:

a device configured to receive, from the member private key generator apparatus, a part $k_{i1}$ of a representation and user identifying information ID(i) associated with each other, when a member private key including representation parts $k_{i1}$ and $k_{i2}$ satisfying a relational equation $=G_1\^{k_{i1}}G_2\^{k_{i2}}$ is generated based on a relational equation $k_{i1}=b-ak_{i2}$ mod q, by the member private key generator apparatus, for each piece of the user identifying information ID(i), based on a public parameter including a prime order q used in the group signature method and a generator $G_1$ of a multiplication cyclic group gG of the above q, a member private key generating private key including values a and $b \in Z_q^*$, and a group public key including values $G_2$ and F and the generator $G_1$ (with the proviso that $G_2=G_1^a$ and $F=G_1^b$);

a storage device for a revocation administrator in which the received user identifying information ID(i) and the received part $k_{i1}$ of the representation are associated with each other and stored;

a revocation list generation device configured to generate a revocation list including the corresponding part $k_{i1}$ of the representation in the storage device for the revocation administrator, based on the user identifying information ID(i), when the user identifying information ID(i) indicating a revoked member is input; and a device configured to transmit the revocation list to the verifier apparatus.

9. A signer identity proving apparatus which is configured to communicate with a group administrator apparatus, a signer apparatus and a verifier apparatus using a group signature method, the signer identity proving apparatus comprising:

a storage device in which a part $k_{i1}$ of a representation in a member private key generated by the group administrator apparatus for each piece of user identifying information ID(i) is stored;

a device configured to select a random number $r_1 \in Z_q^*$ based on a public parameter including a prime order q used in the group signature method and a generator $G_1$ of a multiplication cyclic group gG of the above q;

a device configured to calculate a commitment $R'=U_1\^{r_{i1}}$ of a zero-knowledge proof based on a value $U_1$ in a group signature σ and the selected random number $r_1$, on receiving, from the signer apparatus, the group signature σ including a value R and the value $U_1$ (with the proviso that $R=T_i^r$, $U_1=G_1^r$ and $T_i=G_1^r$, in which r is a random number);

a device configured to transmit the calculated commitment R' to the verifier apparatus;

a device configured to receive, from the verifier apparatus, a random number $\delta \in Z_q^*$ which becomes a challenge of the zero-knowledge proof;

a device configured to calculate a parameter $s_1'=r_1+\delta k_{i1}$ mod q which is a response to the zero-knowledge proof, based on the random number δ which becomes the challenge, the random number $r_1$, the part $k_{i1}$ of the representation and the prime order q; and a device configured to transmit the calculated parameter $s_1'$ to the verifier apparatus configured to verify a verifying equation $R'=R\^{-\delta}U_1\^{s_1'}$.

* * * * *